(12) United States Patent
Wong

(10) Patent No.: US 12,219,561 B2
(45) Date of Patent: Feb. 4, 2025

(54) COMMUNICATIONS DEVICES AND METHODS

(71) Applicant: Sony Group Corporation, Tokyo (JP)

(72) Inventor: Shin Horng Wong, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 370 days.

(21) Appl. No.: 17/629,785

(22) PCT Filed: Jul. 24, 2020

(86) PCT No.: PCT/EP2020/071051
§ 371 (c)(1),
(2) Date: Jan. 25, 2022

(87) PCT Pub. No.: WO2021/023534
PCT Pub. Date: Feb. 11, 2021

(65) Prior Publication Data
US 2022/0322326 A1    Oct. 6, 2022

(30) Foreign Application Priority Data

Aug. 7, 2019   (EP) .................................... 19190624

(51) Int. Cl.
*H04W 72/20*      (2023.01)
*H04W 72/0446*    (2023.01)
*H04W 72/56*      (2023.01)

(52) U.S. Cl.
CPC ....... *H04W 72/20* (2023.01); *H04W 72/0446* (2013.01); *H04W 72/56* (2023.01)

(58) Field of Classification Search
CPC . H04W 72/20; H04W 72/0446; H04W 72/56; H04L 1/1664; H04L 1/1854; H04L 5/0053; H04B 1/40; H04B 1/401
See application file for complete search history.

(56) References Cited

U.S. PATENT DOCUMENTS

2013/0230030 A1   9/2013   Papasakellariou
2020/0296701 A1*  9/2020   Park ...................... H04L 1/1896

FOREIGN PATENT DOCUMENTS

CN    107925525 A    4/2018
CN    108293248 A    7/2018
(Continued)

OTHER PUBLICATIONS

Huawei R1-1907548 U1 intra UE multiplexing between control channel and data channel May 2019 (Year: 2019).*
(Continued)

*Primary Examiner* — Rina C Pancholi
(74) *Attorney, Agent, or Firm* — XSENSUS LLP

(57) ABSTRACT

A communications device comprising transceiver circuitry and controller circuitry configured in combination with the transceiver circuitry to receive one or more first control signals each comprising an indication of one of one or more first sets of radio resources in each of which one of one or more first downlink signals is to be received, to determine that the communications device should transmit a feedback signal indicating whether each of the first downlink signals were successfully received, transmit the feedback signal in a second set of radio resources of the wireless access interface indicated by at least one of the first control signals, to determine that the communications device should transmit an uplink signal in a third set of radio resources, and to determine whether the communications device should form a multiplexed signal by multiplexing at least a part of the feedback signal into the uplink signal.

20 Claims, 15 Drawing Sheets

(56) References Cited

FOREIGN PATENT DOCUMENTS

| CN | 109937553 A | 6/2019 |
|----|----|----|
| WO | WO-2018004268 A1 | 1/2018 |
| WO | WO-2019099670 A1 | 5/2019 |
| WO | WO-2019141685 A1 | 7/2019 |

OTHER PUBLICATIONS

International Search Report and Written Opinion mailed on Nov. 4, 2020, received for PCT Application PCT/EP2020/071051, Filed on Jul. 24, 2020, 10 pages.
Motorola Mobility et al., "UCI Enhancement for URLLC", 3GPP TSG RAN WG1 Meeting #97, R1-1907242, May 13-17, 2019, 3 pages.
Asia Pacific Telecom, "UCI Enhancements for NR URLLC", 3GPP TSG-RAN WG1 Meeting #97, R1-1907362, May 13-17, 2019, 3 pages.
Huawei et al., "UL Intra-UE Multiplexing Between Control Channel and Data Channel", 3GPP TSG RAN WG1 Meeting #97, R1-1907548, May 13-17, 2019, 3 pages.
Itri, "UCI Enhancements for URLLC", 3GPP TSG RAN WG1 #97, R1-1907310, May 13-17, 2019, 3 pages.
Etri, "PUSCH Enhancements for Urllc", 3GPP TSG RAN WG1 Meeting #97, R1-1907042, May 13-17, 2019, 6 pages.
Holma et al., "LTE for UMTS OFDMA and SC-FDMA Based Radio Access", John Wiley & Sons, 2009, 232 pages.
3GPP, "Study on Scenarios and Requirements for Next Generation Access Technologies (Release 14)", 3GPP TR 38.913, V14.3.0, Jun. 2017, 39 pages.
Huawei et al., "New WID: Physical Layer Enhancements for NR Ultra-Reliable and Low Latency Communication (URLLC)", 3GPP TSG RAN Meeting #83, RP-190726, Mar. 18-21, 2019, 5 Pages.
"3rd Generation Partnership Project; Technical Specification Group Radio Access Network; NR; Physical layer procedures for control (Release 15)", 3GPP Standard; Technical Specification; 3GPP TS 38.213, 3RD Generation Partnership Project (3GPP), Mobile Competence Centre ; 650, Route Des Lucioles ; F-06921 Sophia-Antipolis Cedex ; France, vol. RAN WG1, No. V15.6.0, Jun. 24, 2019 (Jun. 24, 2019), pp. 1-107, XP051754327.
OPPO: "Remaining issues for UL control", 3GPP Draft; R1-1808893, 3RD Generation Partnership Project (3GPP), Mobile Competence Centre ; 650, Route Des Lucioles ; F-06921 Sophia-Antipolis Cedex; France, vol. Ran WG1, No. Gothenburg, Sweden; 20180820-20180824 Aug. 10, 2018 (Aug. 10, 2018), XP051516264.

* cited by examiner

COMMUNICATIONS DEVICES AND METHODS

CROSS-REFERENCE TO RELATED APPLICATIONS

The present application is based on PCT/EP2020/071051 filed on Jul. 24, 2020, and claims priority to EP 19190624.7 filed on Aug. 7, 2019, the entire contents of each are incorporated herein by reference.

BACKGROUND

Field of Disclosure

FIELD OF DISCLOSURE

The present disclosure relates to communications devices, infrastructure equipment and methods for the transmission of data by a communications device in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Latest generation mobile telecommunication systems, such as those based on the 3GPP defined UMTS and Long Term Evolution (LTE) architecture, are able to support a wider range of services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, is expected to continue to increase rapidly.

Future wireless communications networks will be expected to routinely and efficiently support communications with an ever increasing range of devices associated with a wider range of data traffic profiles and types than existing systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance. Other types of device, for example supporting high-definition video streaming, may be associated with transmissions of relatively large amounts of data with relatively low latency tolerance. Other types of device, for example used for autonomous vehicle communications and for other critical applications, may be characterised by data that should be transmitted through the network with low latency and high reliability. A single device type might also be associated with different traffic profiles/characteristics depending on the application(s) it is running For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario (data subject to stringent reliability and latency requirements).

In view of this there is expected to be a desire for future wireless communications networks, for example those which may be referred to as 5G or new radio (NR) systems/ new radio access technology (RAT) systems, as well as future iterations/releases of existing systems, to efficiently support connectivity for a wide range of devices associated with different applications and different characteristic data traffic profiles and requirements.

One example of a new service is referred to as Ultra Reliable Low Latency Communications (URLLC) services which, as its name suggests, requires that a data unit or packet be communicated with a high reliability and with a low communications delay. Another example of a new service is Enhanced Mobile Broadband (eMBB) services, which are characterised by a high capacity with a requirement to support up to 20 Gb/s. URLLC and eMBB type services therefore represent challenging examples for both LTE type communications systems and 5G/NR communications systems.

The increasing use of different types of network infrastructure equipment and terminal devices associated with different traffic profiles give rise to new challenges for efficiently handling communications in wireless communications systems that need to be addressed.

SUMMARY OF THE DISCLOSURE

The present disclosure can help address or mitigate at least some of the issues discussed above.

Embodiments of the present technique can provide a communications device configured to transmit data or receive data. The communications device comprises transceiver circuitry configured to transmit signals and receive signals via a wireless access interface, and controller circuitry configured in combination with the transceiver circuitry to receive one or more first control signals each comprising an indication of one of one or more first sets of radio resources of the wireless access interface in each of which the communications device is to receive one of one or more first downlink signals, to decode the one or more first downlink signals, to determine that the communications device should transmit a feedback signal indicating, for each of the first downlink signals, whether or not the each of the first downlink signals were successfully received, wherein the communications device is configured to transmit the feedback signal in a second set of radio resources of the wireless access interface indicated by at least one of the first control signals, to determine that the communications device should transmit an uplink signal in a third set of radio resources of the wireless access interface, the third set of radio resources at least partially overlapping in time with or sharing a same time-divided slot of the wireless access interface with the second set of radio resources, and to determine, in accordance with at least one communications criterion, whether the communications device should form a multiplexed signal by multiplexing at least a part of the feedback signal into the uplink signal and transmit the multiplexed signal in the third set of radio resources of the wireless access interface.

Embodiments of the present technique, which in addition to communications devices relate to methods of operating communications devices and circuitry for communications devices, allow for more efficient use of radio resources by a communications device.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
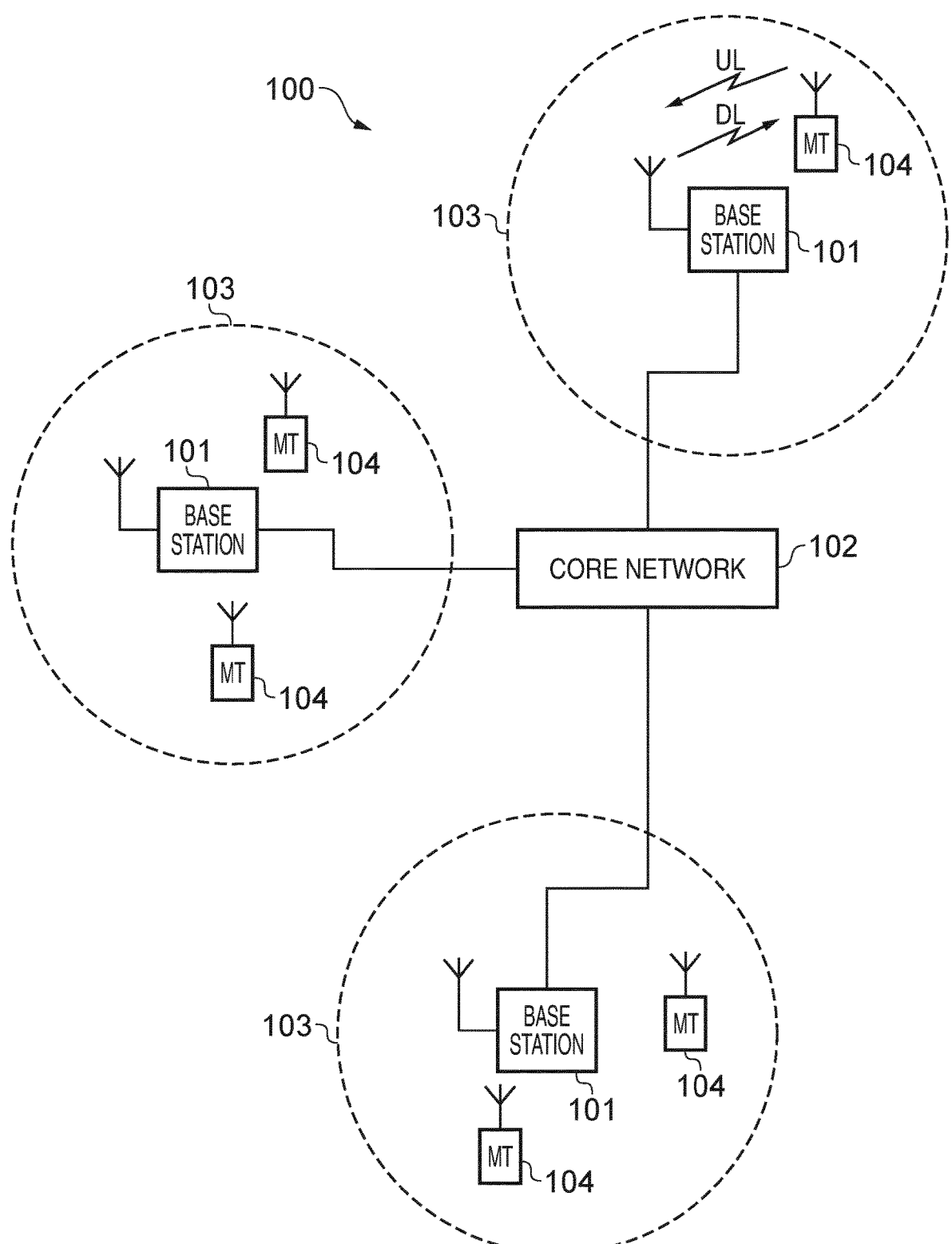
FIG. 1 schematically represents some aspects of an LTE-type wireless telecommunication system which may be configured to operate in accordance with certain embodiments of the present disclosure.

Long Term Evolution Advanced Radio Access Technology (4G) FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [1]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink (DL). Data is transmitted from terminal devices 104 to the base stations 101 via a radio uplink (UL). The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.
New Radio Access Technology (5G)

Figure 2:
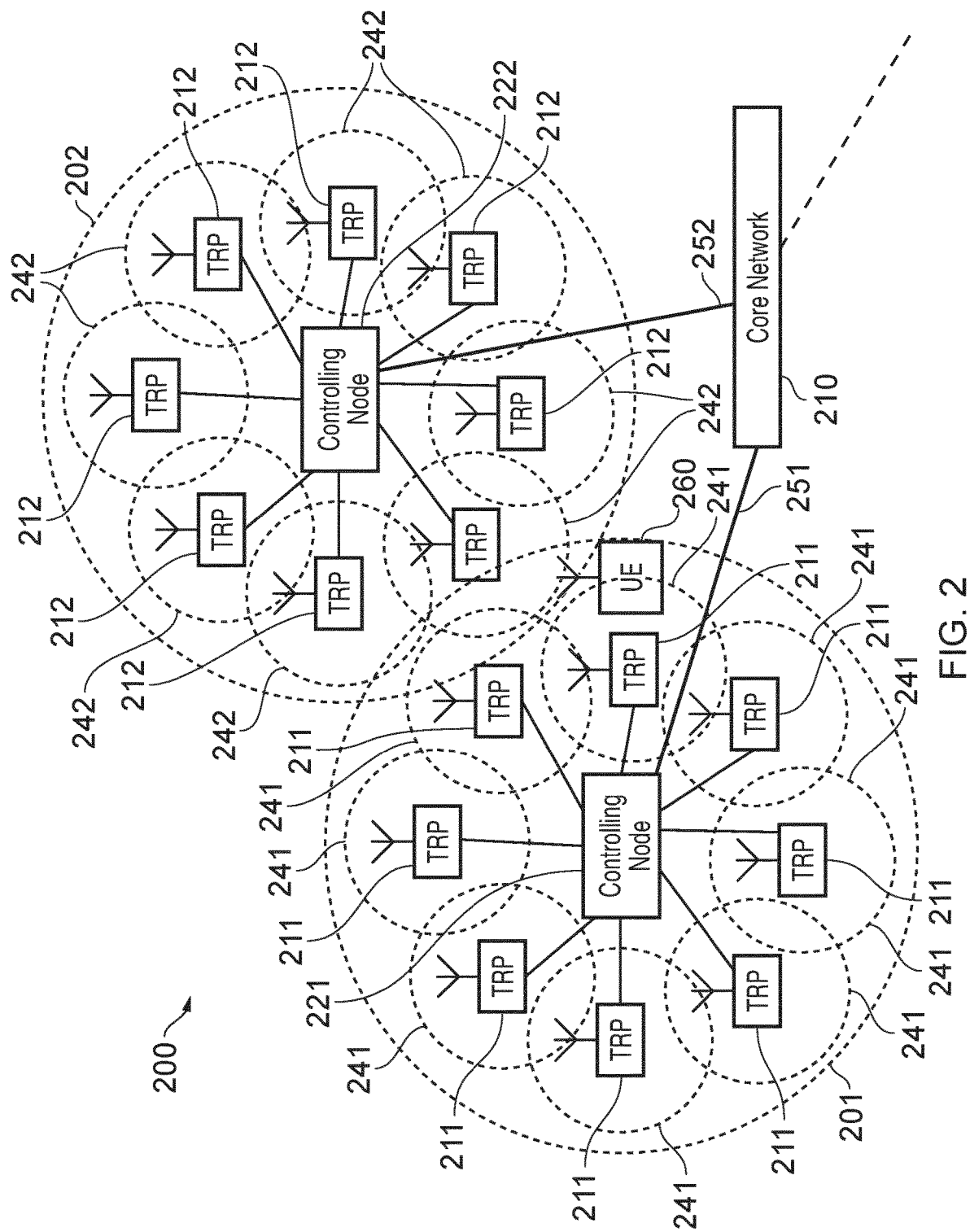
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/ remote transmission and reception points (TRPs)) 211, 212 in their respective cells. Again, these communications may be over respective wired or wireless links. The distributed units (DUs) 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/ access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
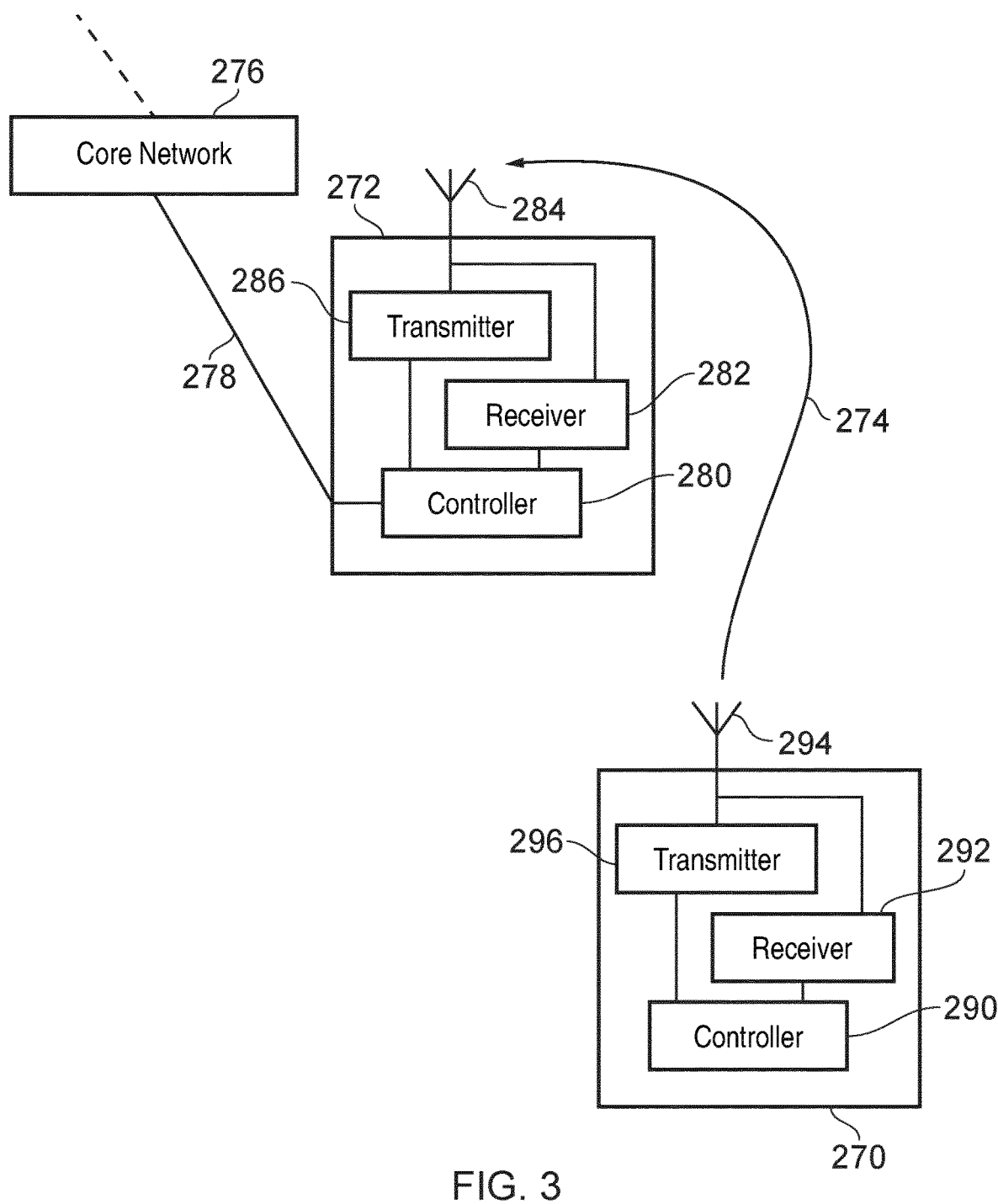
FIG. 3 is a schematic block diagram of an example infrastructure equipment and communications device which may be configured to operate in accordance with certain embodiments of the present disclosure.

A more detailed illustration of a UE 270 and an example network infrastructure equipment 272, which may be thought of as an eNB 101 or a combination of a controlling node 221 and TRP 211, is presented in FIG. 3. As shown in FIG. 3, the UE 270 is shown to transmit uplink data to the infrastructure equipment 272 via resources of a wireless access interface as illustrated generally by an arrow 274. The UE 270 may similarly be configured to receive downlink data transmitted by the infrastructure equipment 272 via resources of the wireless access interface (not shown). As with FIGS. 1 and 2, the infrastructure equipment 272 is connected to a core network 276 via an interface 278 to a controller 280 of the infrastructure equipment 272. The infrastructure equipment 272 includes a receiver 282 connected to an antenna 284 and a transmitter 286 connected to the antenna 284. Correspondingly, the UE 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

The controllers 280, 290 may be configured to carry out instructions which are stored on a computer readable medium, such as a non-volatile memory. The processing steps described herein may be carried out by, for example, a microprocessor in conjunction with a random access memory, operating according to instructions stored on a computer readable medium.

5G and eURLLC

Systems incorporating NR technology are expected to support different services (or types of services), which may be characterised by different requirements for latency, data rate and/or reliability. For example, Enhanced Mobile Broadband (eMBB) services are characterised by high capacity with a requirement to support up to 20 Gb/s. The requirements for Ultra Reliable and Low Latency Communications (URLLC) services are for a reliability of $1\text{-}10^{-5}$ (99.999%) or higher for one transmission of a 32 byte packet is required to be transmitted from the radio protocol layer 2/3 SDU ingress point to the radio protocol layer 2/3 SDU egress point of the radio interface within 1 ms with a reliability of 99.999% to 99.9999% [2]. Massive Machine Type Communications (mMTC) is another example of a service which may be supported by NR-based communications networks. In addition, systems may be expected to support further enhancements related to Industrial Internet of Things (IIoT) in order to support services with new requirements of high availability, high reliability, low latency, and in some cases, high-accuracy positioning.

Enhanced URLLC (eURLLC) [3] specifies features that require high reliability and low latency, such as factory automation, transport industry, electrical power distribution, etc. It should be appreciated that the Uplink Control Information (UCI) for URLLC and eMBB will have different requirements. Hence, one of the current objectives of eURLLC is to enhance the UCI to support URLLC, where the aim is to allow more frequent PUCCHs carrying HARQ-ACK feedback per slot, and to support multiple HARQ-ACK codebooks for different traffic services.

Hybrid Automatic Repeat Request Acknowledgements (HARQ-ACK)

Figure 4:
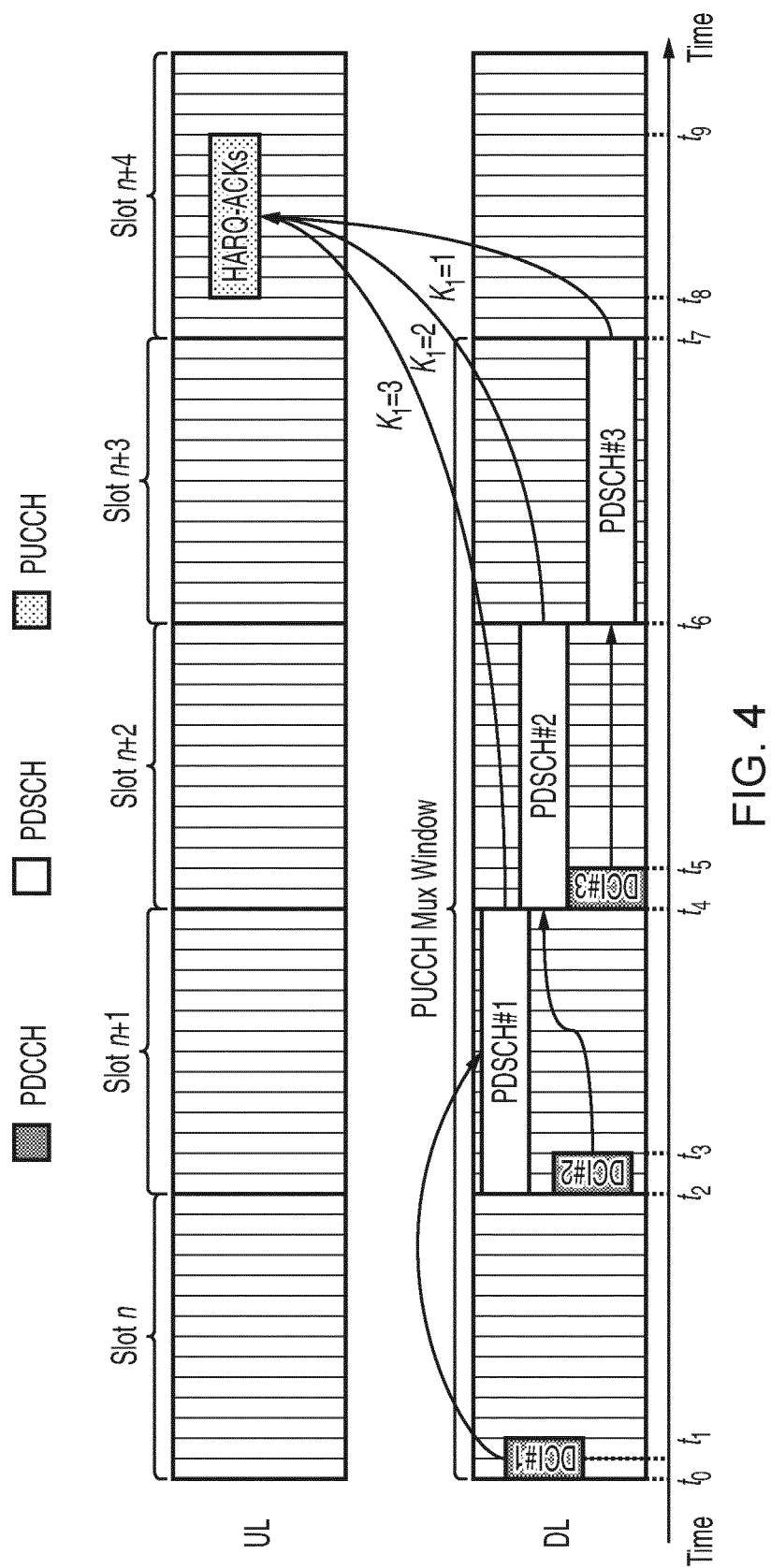
FIG. 4 shows an example of how a User Equipment (UE) may multiplex multiple Hybrid Automatic Repeat Request Acknowledgements (HARQ-ACKs) into a single Physical Uplink Control Channel (PUCCH)

A HARQ-ACK feedback is transmitted to the gNB, in response to Physical Downlink Shared Channel (PDSCH) scheduling, to inform the gNB whether the UE has successfully decoded the PDSCH or not. For a PDSCH ending in slot n, the corresponding PUCCH carrying the HARQ-ACK is transmitted in slot $n+K_1$, where the value of $K_1$ is indicated in the field "PDSCH-to-HARQ_feedback timing indicator" of the DL Grant (carried by DCI Format 1_0 or DCI Format 1_1). Multiple (different) PDSCHs can point to the same slot for transmissions of their respective HARQ-ACKs and these HARQ-ACKs (in the same slot) are then multiplexed by the UE into a single PUCCH. Hence, a PUCCH can contain multiple HARQ-ACKs for multiple PDSCHs. An example is shown in FIG. 4, in which three DL Grants are transmitted to the UE via DCI #1, DCI #2 and DCI #3 in slot n, n+1 and n+2 respectively. DCI #1, DCI #2 and DCI #3 schedule PDSCH #1, PDSCH #2 and PDSCH #3 respectively. DCI #1, DCI #2 and DCI #3 further indicate $K_1=3$, $K_1=2$ and $K_1=1$ respectively. Since the $K_1$ values indicate that the HARQ-ACK feedbacks for PDSCH #1, PDSCH #2 and PDSCH #3 are all transmitted in slot n+4, the UE multiplexes all three of these HARQ-ACKs into a single PUCCH. The PUCCH Multiplexing Window is a time window during which PDSCHs can be multiplexed into that single PUCCH, where this PUCCH Multiplexing Window depends on the range of $K_1$ values. In the example shown by FIG. 4, the PUCCH Multiplexing Window is from Slot n to Slot n+3, which means the max $K_1$ value is 4 slots.

The PUCCH resource is determined based on the DL Grant scheduling the last PDSCH in the PUCCH Multiplexing Window, since the UE only knows the total number of HARQ-ACK bits after the last PDSCH is received. Additionally, the UE follows the PUCCH Resource Indicator (PRI) in the DL Grant of the last PDSCH to determine which PUCCH resource within a PUCCH resource set to use. In the example in in FIG. 4, the last PDSCH in the PUCCH Multiplexing Window is PDSCH #3 and the corresponding DL Grant is DCI #3.

Figure 5:
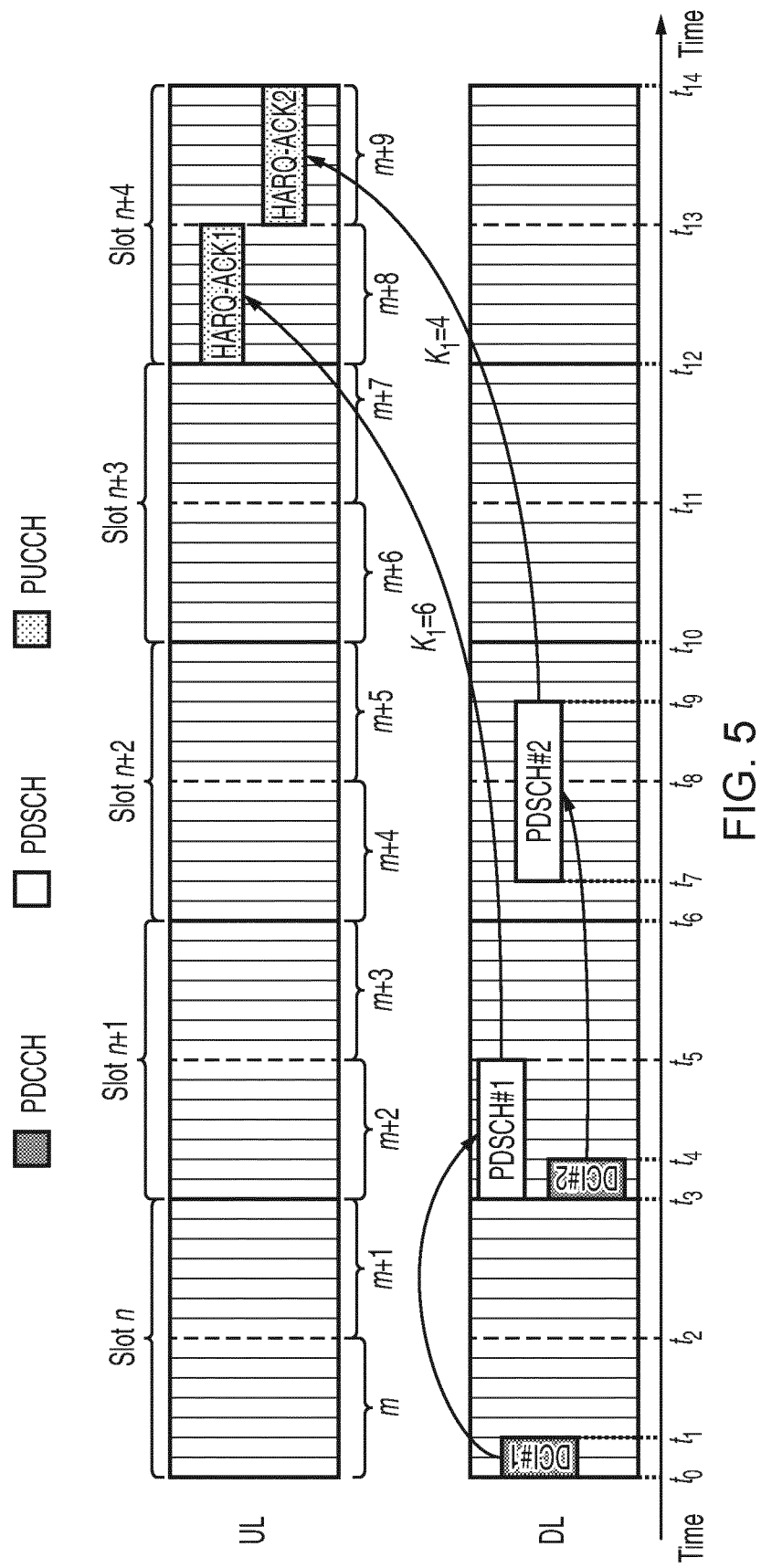
FIG. 5 shows an example of sub-slot based HARQ-ACK PUCCHs.

In Rel-16 eURLLC, the concept of sub-slots is introduced for PUCCH carrying HARQ-ACK for URLLC PDSCH. That is, the granularity of the $K_1$ value (i.e. the time difference between end of PDSCH and the start of its corresponding PUCCH) is smaller than a slot. An example is shown in FIG. 5, where the sub-slot size=7 symbols (i.e. half a slot) and the sub-slots are labelled as m, m+1, m+2, etc. PDSCH #1 is transmitted in slot n+1 but for sub-slot based HARQ-ACK PUCCH, it is transmitted in sub-slot m+2 and here $K_1=6$, which means that the corresponding HARQ-ACK1 is in sub-slot $m+2+K_1=m+8$. PDSCH #2 is transmitted in slot n+2 but occupies sub-slot m+4 and m+5. The reference for $K_1$ is relative to the sub-slot where the PDSCH ends and in this case PDSCH #2 ends in sub-slot m+5. The DL Grant in DCI #2 that schedules PDSCH #2 indicates a $K_1=4$ which schedules a PUCCH for its HARQ-ACK at sub-slot $m+5+K_1$=sub-slot $m+9$.

PUSCH and HARQ-ACK Collision

Figure 6:
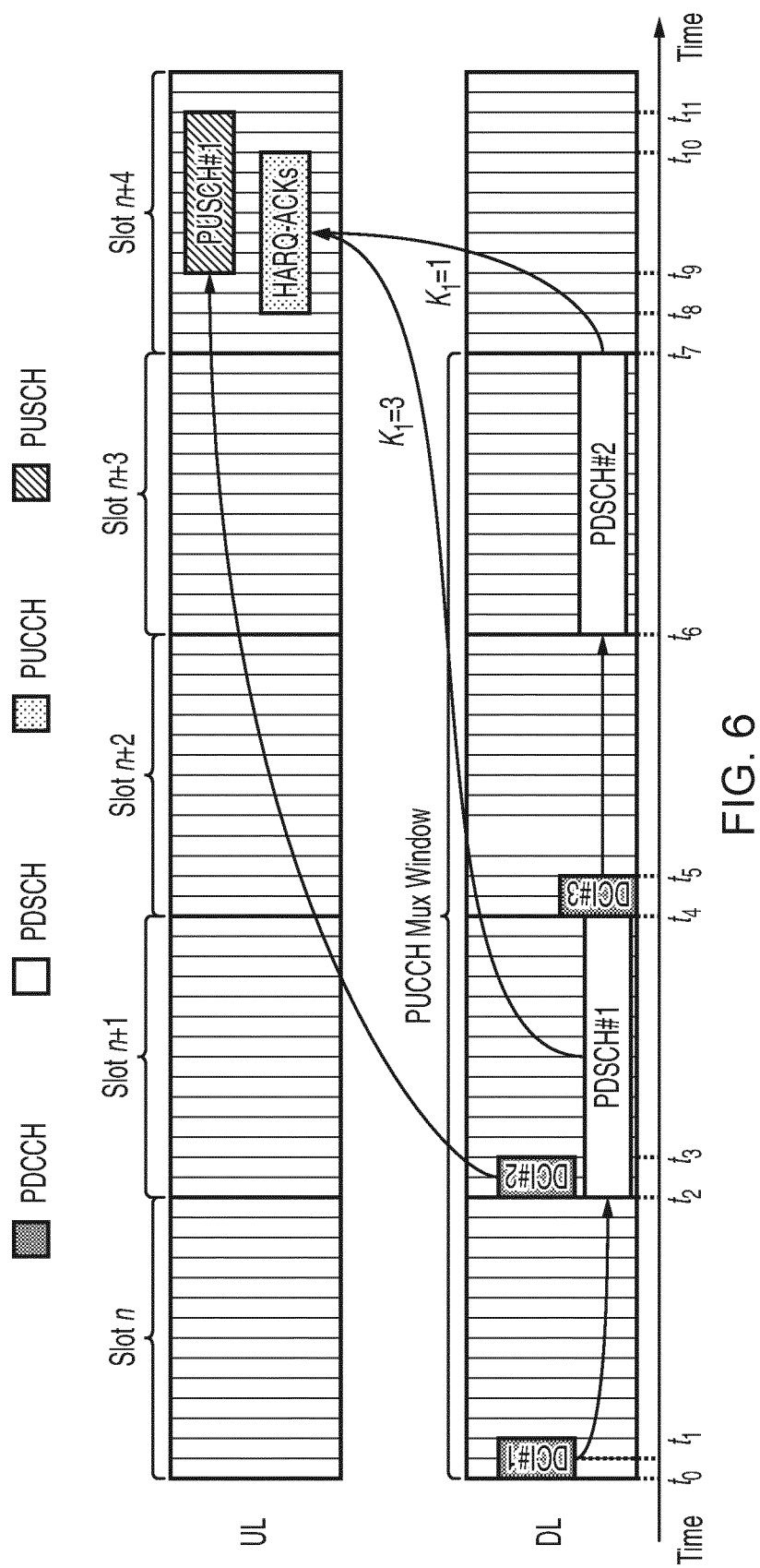
FIG. 6 shows an example of where a HARQ-ACK PUCCH may collide with a Physical Uplink Shared Channel (PUSCH)

Given the flexibility in allocating the PUCCH resources, it is possible that a Physical Uplink Shared Channel (PUSCH) collides in time with a PUCCH carrying HARQ-ACK in the same UE, i.e. an intra-UE PUSCH and HARQ-ACK collision. An example is shown in FIG. 6, where DCI #1 and DCI #3 schedule PDSCH #1 and PDSCH #2 respectively, and their HARQ-ACK feedbacks are both scheduled in slot n+4, i.e., they are multiplexed into a single PUCCH. DCI #2 schedules PUSCH #1 to be transmitted in slot n+4, leading to it to overlap in time with the PUCCH carrying HARQ-ACKs, i.e. PUSCH #1 collides with HARQ-ACK.

In Rel-15, the HARQ-ACK information is multiplexed into the colliding PUSCH and the PUSCH is transmitted. However, since a single UE can support eMBB and URLLC, the PUSCH and the HARQ-ACK may have different priorities, and such multiplexing may not be suitable. There are two such scenarios:
1. The colliding PUSCH carries eMBB traffic whilst the PUCCH carries HARQ-ACK feedbacks for URLLC PDSCH. Here the PUSCH may not have sufficient reliability to carry the HARQ-ACKs; and
2. The colliding PUSCH carries URLLC traffic whilst the PUCCH carries HARQ-ACK feedbacks for eMBB PDSCH. Here multiplexing the HARQ-ACK feedbacks into the URLLC may degrade the reliability of the PUSCH.

One proposal is to drop the lower priority channel, e.g. the PUSCH or the PUCCH carrying HARQ-ACK. For the case where the lower priority channel is the PUCCH, dropping the HARQ-ACK would lead to retransmission of multiple eMBB PDSCHs and since eMBB uses large TBS (Transport Block Size), this leads to inefficient use of resources.

Intra-UE PUSCH and HARQ-ACK Collision

Figure 7:
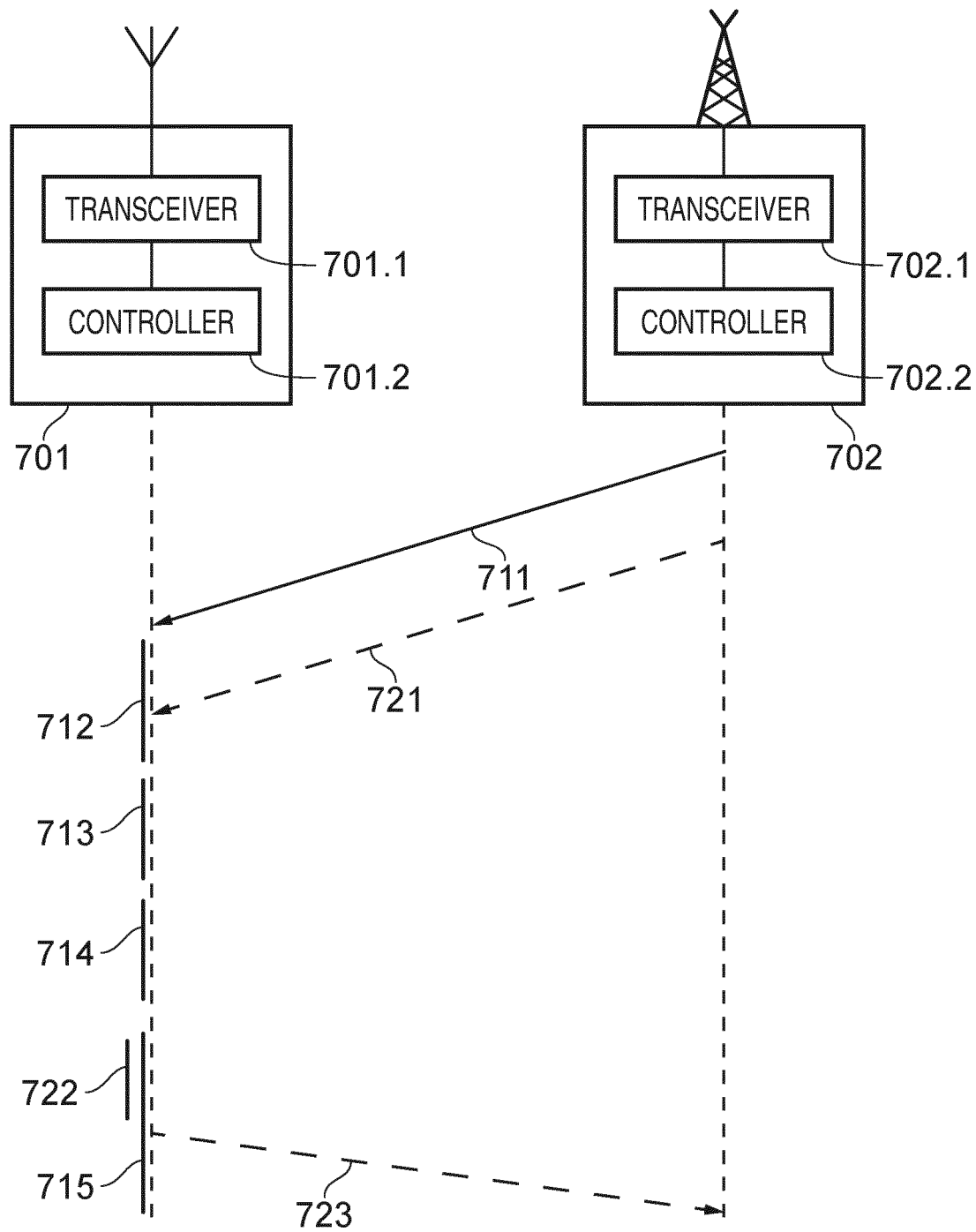
FIG. 7 shows a part schematic, part message flow diagram representation of a wireless communications network comprising a communications device and an infrastructure equipment in accordance with embodiments of the present technique.

FIG. 7 shows a part schematic, part message flow diagram representation of a wireless communications network comprising a communications device 701 and an infrastructure equipment 702 in accordance with at least some embodiments of the present technique. The communications device 701 is configured to transmit data to or receive data from an infrastructure equipment 702, via a wireless access interface provided by the wireless communications network. The communications device 701 and the infrastructure equipment 702 each comprise a transceiver (or transceiver circuitry) 701.1, 702.1, and a controller (or controller circuitry) 701.2, 702.2. Each of the controllers 701.2, 702.2 may be, for example, a microprocessor, a CPU, or a dedicated chipset, etc.

As shown in the example of FIG. 7, the transceiver circuitry 701.1 and the controller circuitry 701.2 of the communications device 701 are configured in combination to receive 711 (from the infrastructure equipment 702) one or more first control signals each comprising an indication of one of one or more first sets of radio resources of the wireless access interface in each of which the communications device 701 is to receive 721 one of one or more first downlink signals (from the infrastructure equipment 702), to decode 712 the one or more first downlink signals (received from the infrastructure equipment 702 in each of the one or more first sets of radio resources), to determine 713 that the communications device 701 should transmit a feedback signal (to the infrastructure equipment 702) indicating, for each of the first downlink signals, whether or not the each of the first downlink signals were successfully received 721 (from the infrastructure equipment 702), wherein the communications device 701 is configured to transmit the feedback signal (to the infrastructure equipment 702) in a second set of radio resources of the wireless access interface indicated by at least one of the first control signals, to determine 714 that the communications device 701 should transmit an uplink signal (to the infrastructure equipment 702) in a third set of radio resources of the wireless access interface, the third set of radio resources at least partially overlapping in time (or sharing a same time-divided slot of the wireless access interface) with the second set of radio resources, and to determine 715, in accordance with at least one communications criterion, whether the communications device 701 should form a multiplexed signal by multiplexing 722 at least a part of the feedback signal into the uplink signal and transmit 723 the multiplexed signal (to the infrastructure equipment 702) in the third set of radio resources of the wireless access interface.

Essentially, embodiments of the present technique propose that the HARQ-ACK UCI (Uplink Control Information) should be multiplexed into the colliding PUSCH. This should be done if, for example, sufficient time is available to the UE to provide a reliable PUSCH, after some of the HARQ-ACK UCI bits are known to the UE. In other words, the at least one communications criterion comprises whether a length of time between one of the one or more first control signals and the start of the third set of radio resources is greater than a minimum amount of time required by the communications device to form the multiplexed signal which meets at least one reliability requirement. Here, the at least one reliability requirement may be dependent on a number of bits in the feedback signal. This sufficient time can be used by the UE to determine whether the code rate of the PUSCH can meet the reliability requirement after adding the extra HARQ-ACK bits and if not, to construct—or if feasible to re-construct—the PUSCH such that the reliability requirement is met, e.g. by lowering the code rate, or increasing the transmission power. In other words, the at least one reliability requirement comprises a coding rate of the multiplexed signal being below a threshold coding rate.

If the said sufficient time is not available, or the UE determines that it cannot reconstruct the PUSCH due to its capability, or determines that it cannot construct a PUSCH that meets the required reliability if the extra HARQ-ACK bits are included—i.e. the UE determines that multiplexing is not feasible—then the UE drops the lower priority channel. For example, If the PUSCH carries eMBB traffic whilst the PUCCH carries HARQ-ACK feedback for URLLC PDSCHs, the UE drops the PUSCH; or On the other hand, if the PUSCH carries URLLC traffic whilst the PUCCH carries HARQ-ACK feedback for eMBB PDSCHs, the UE drops the PUCCH.

In other words, each of the uplink signal and the first downlink signals are associated with a different priority level, the feedback signal being associated with the same priority level as the first downlink signals, and the communications device is configured, if the communications device determines that the multiplexed signal should not be formed, to drop the one of the uplink signal and the feedback signal depending on which of the uplink signal and the feedback signal has the lowest priority level, and to transmit only the one of the uplink signal and the feedback signal having the highest priority level.

Unless specifically noted, and as should be appreciated by those skilled in the art, the following arrangements of embodiments of the present technique are applicable whether the PUSCH carries eMBB or URLLC traffic and the PUCCH carries feedback for eMBB PDSCH or URLLC PDSCH.

Figure 8:
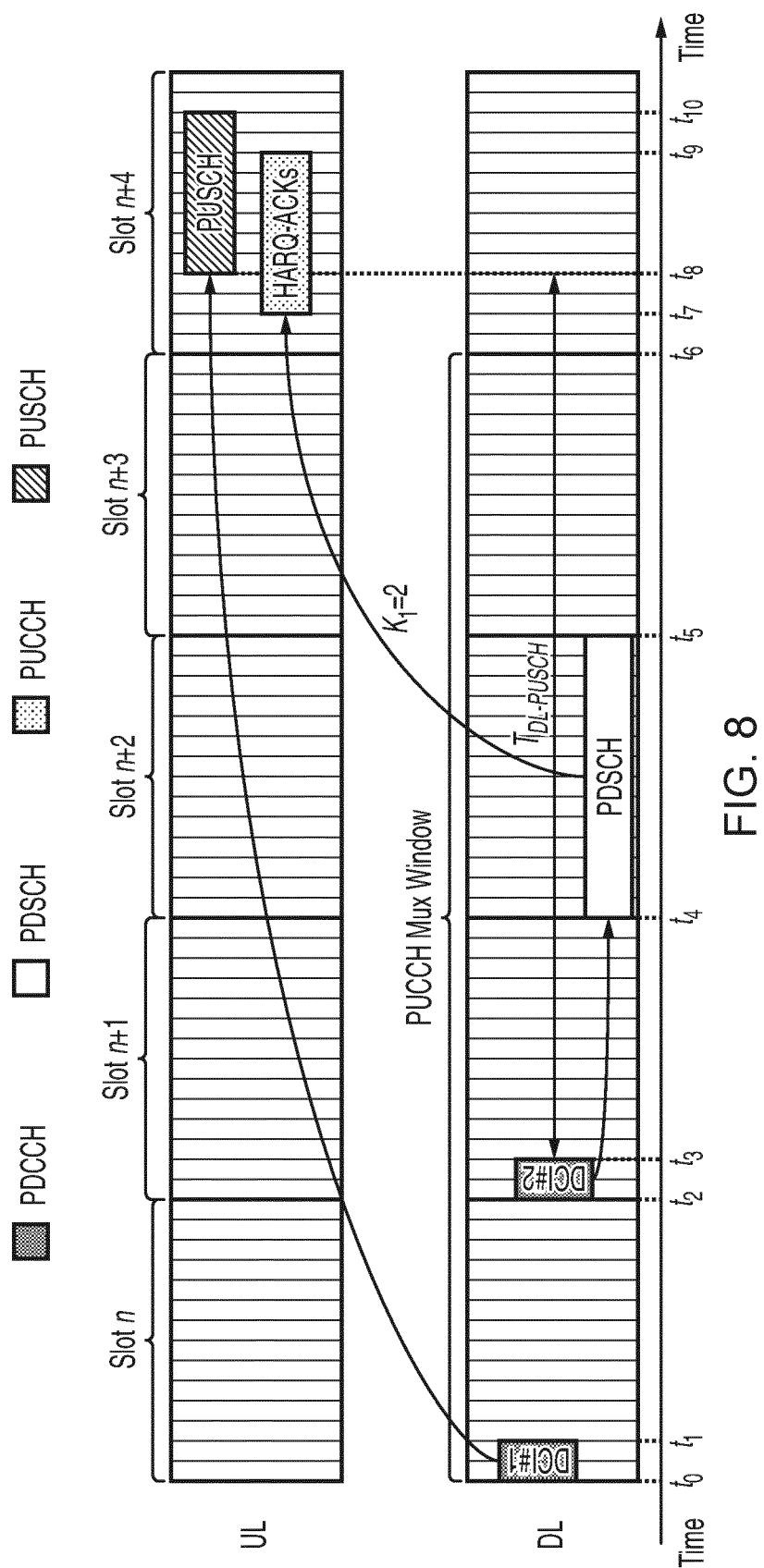
FIG. 8 shows a first example of how a UE may multiplex a HARQ-ACK PUCCH with a PUSCH where the HARQ-ACK and PUSCH collide based on a threshold time in accordance with embodiments of the present technique.

In another arrangement of embodiments of the present technique, the UE is deemed to have the said sufficient time, if the time between the PDCCH carrying the DL Grant and the start of the PUSCH, $T_{DL-PUSCH}$, is greater than a threshold $T_{PUSCH}$, i.e. if $T_{DL-PUSCH}>T_{PUSCH}$, then the UE should multiplex HARQ-ACK into PUSCH. In other words, the at least one communications criterion comprises whether a length of time between reception of a first signal and the start of the third set of radio resources is greater than a threshold length of time. Here, the first signal is one of the first control signals. An example is shown in FIG. 8, where DCI #1 carries an UL Grant, which schedules a PUSCH in slot n+4 whilst DCI #2 schedules a PDSCH with a corresponding HARQ-ACK PUCCH allocated in slot n+4, thereby causing the PUSCH and HARQ-ACK to collide. The time $T_{DL-PUSCH}$ is between DCI #2 and PUSCH, i.e. between time $t_3$ and $t_8$. Here if $T_{DL-PUSCH}$ is large enough, i.e. $T_{DL-PUSCH}>T_{PUSCH}$, then even if the MAC had constructed the PUSCH, the UE has sufficient time to determine whether the code rate is low enough and, if not, to reconstruct the PUSCH that has a lower coding rate to carry the PUSCH and the HARQ-ACK UCIs that meets the reliability requirement. Of course if the UE is not capable of reconstructing a PUSCH after it had already been constructed then as described above, the lower priority channel is dropped. The value of $T_{PUSCH}$ can be a UE capability that is determined in the specifications (where this capability can be signalled to the network) or it is Radio Resource Control (RRC) signalled to the UE based on the UE's capabilities that are known to the network.

Figure 9:
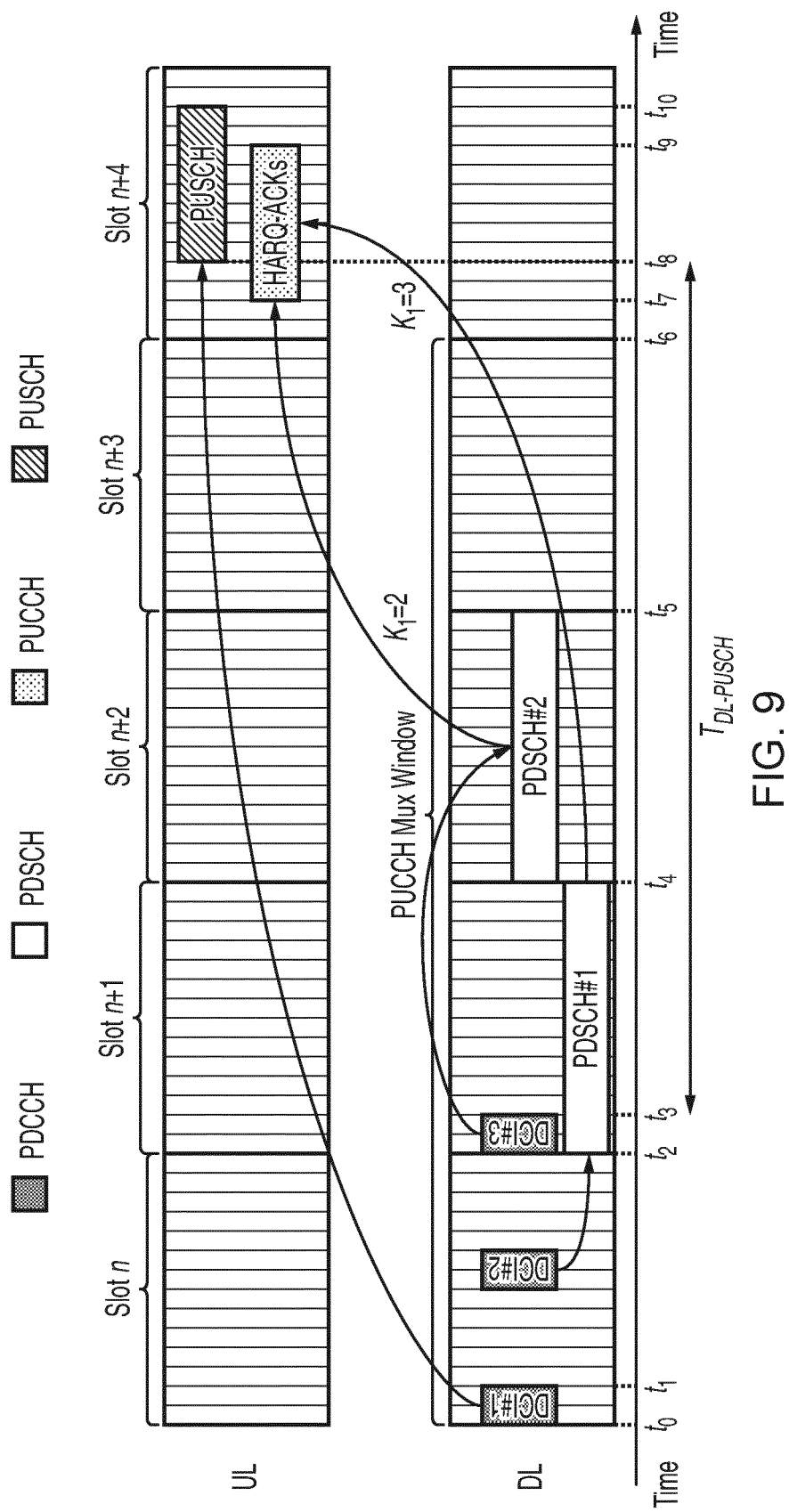
FIG. 9 shows a second example of how a UE may multiplex a HARQ-ACK PUCCH with a PUSCH where the HARQ-ACK and PUSCH collide based on a threshold time in accordance with embodiments of the present technique.

In some implementations of the above-described arrangement, the time $T_{DL-PUSCH}$ is the time between the DL Grant of the last PDSCH in a PUCCH Mux Window and the start of the colliding PUSCH. In other words, the one of the first control signals is a temporally last one of the (one or more) first control signals. An example of this is shown in FIG. 9, where the PUCCH Multiplexing Window covers slot n, n+1, n+2 and n+3. Within the PUCCH Multiplexing Window, PDSCH #1 and PDSCH #2 are scheduled, where PDSCH #2 is the last PDSCH in the PUCCH Multiplexing Window and its corresponding DL Grant is DCI #3. Hence, $T_{DUL-PUSCH}$ is the time between PDCCH carrying DCI #3 and the colliding PUSCH, i.e. between time $t_3$ and $t_8$.

Figure 10:
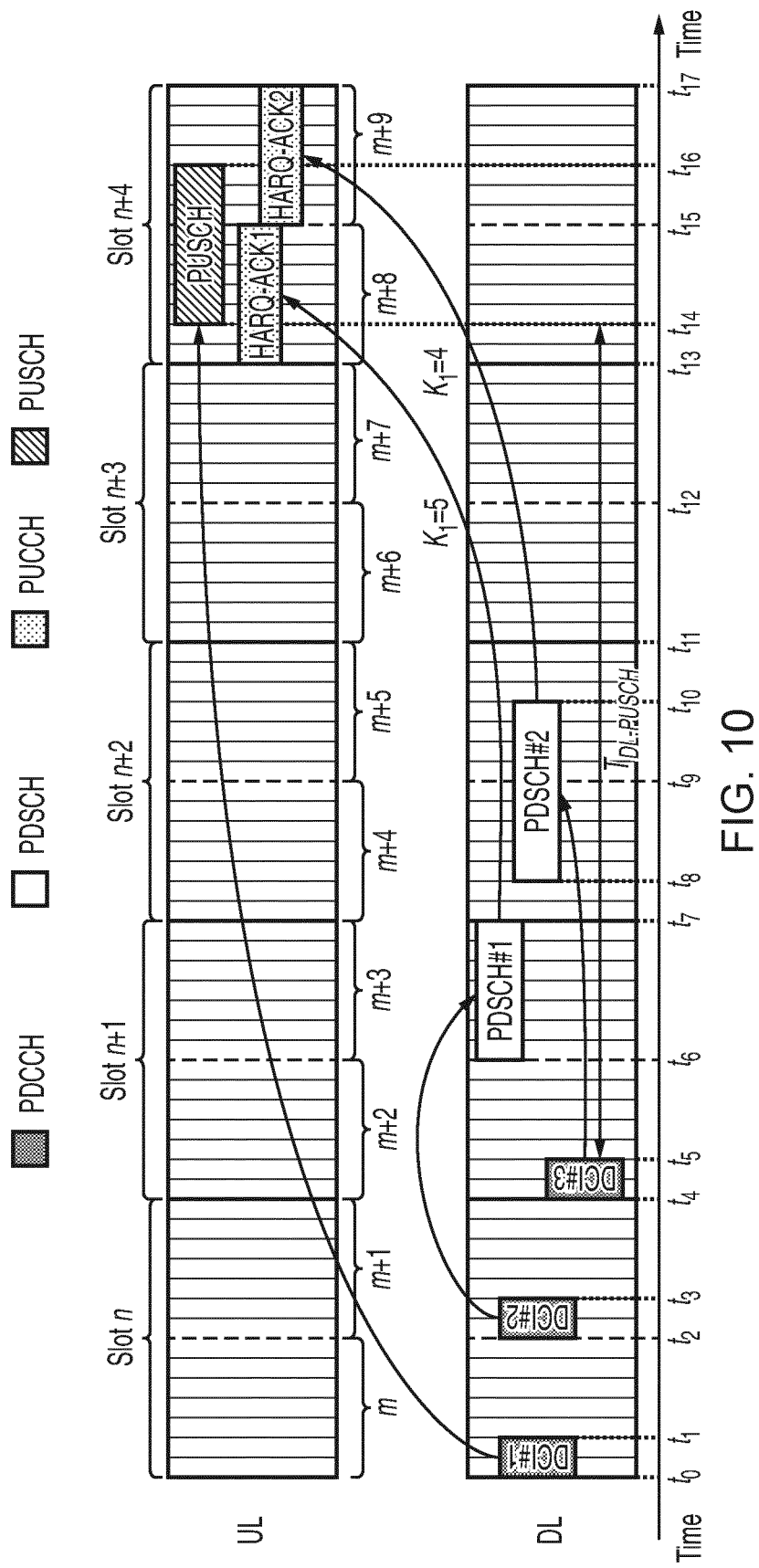
FIG. 10 shows a third example of how a UE may multiplex a HARQ-ACK PUCCH with a PUSCH where the HARQ-ACK and PUSCH collide based on a threshold time in accordance with embodiments of the present technique.

In other implementations of the above-described arrangement, in a sub-slot based PUCCH operation, the time $T_{DL-PUSCH}$ is defined as the DL Grant scheduling the last PDSCH where the corresponding sub-slot PUCCH collides with the PUSCH. It should be appreciated that a PUSCH can collide with multiple HARQ-ACKs under a sub-slot based PUCCH operation. In other words, the feedback signal is a first feedback signal, and the communications device is configured to receive at least one second control signal comprising an indication of a fourth set of radio resources of the wireless access interface in which the communications device is to receive a second downlink signal, to decode the second downlink signal, and to determine that the communications device should transmit a second feedback signal, indicating whether or not the second downlink signal was successfully received, in a fifth set of radio resources, the fifth set of radio resources at least partially overlapping in time (or sharing a same time-divided slot of the wireless access interface with) with the third set of radio resources, wherein the first signal is the second control signal. An example is shown in FIG. 10, where DCI #2 and DCI #3 schedule PDSCH #1 and PDSCH #2 respectively. The corresponding PUCCH for PDSCH #1 and PDSCH #2, i.e. HARQ-ACK1 and HARQ-ACK2 are scheduled in sub-slots m+8 and m+9 respectively. DCI #1 schedules a PUSCH in slot n+4 that collides with HARQ-ACK1 and HARQ-ACK2. Here, the UE would only know the total number of HARQ-ACK bits that need to be multiplexed into a PUSCH after the last PDSCH that has a HARQ-ACK colliding with that PUSCH is scheduled, and in this example, this information is known after the DL Grant in DCI #3 has been sent. If there is sufficient time between DCI #3 and the colliding PUSCH for the UE to determine the code rate and, if feasible, reconstruct the PUSCH to meet the reliability requirement, then HARQ-ACK1 and HARQ-ACK2 can be multiplexed into the PUSCH— or otherwise the lower priority channel (in this example is the PUSCH) is dropped.

Figure 11:
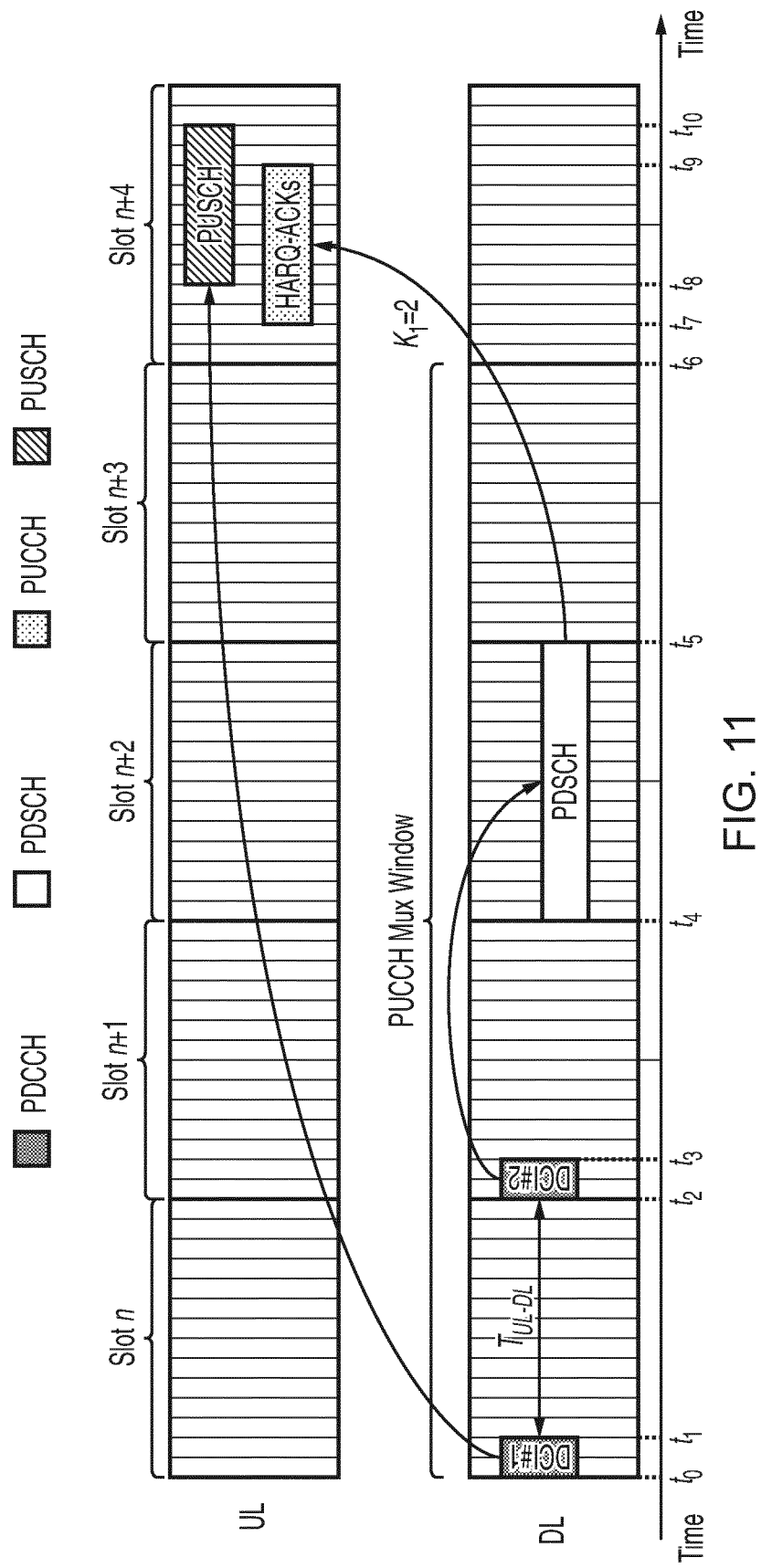
FIG. 11 shows a first example of how a UE may multiplex a HARQ-ACK PUCCH with a PUSCH where the HARQ-ACK and PUSCH collide based on a time between an uplink (UL) grant scheduling the PUSCH and a downlink (DL) grant scheduling a PDSCH to which the HARQ-ACK PUSCH relates in accordance with embodiments of the present technique.

In another arrangement of embodiments of the present technique, the UE is deemed to have the said sufficient time, if the time where the DL Grant arrives after the UL grant $T_{UL-DL}$ is less than a threshold $T_{MAC}$, i.e. if $T_{UL-DL}<T_{MAC}$, then the UE is configured to multiplex HARQ-ACK into PUSCH. In other words, the communications device is configured to receive a third control signal before at least one of the first control signals, the third control signal providing an indication of the third set of radio resources in which the communications device is to transmit the uplink signal, wherein the at least one communications criterion comprises whether a length of time between reception of the third control signal and reception of a first signal is greater than a threshold length of time. Here, the first control signal is one of the at least one first control signals that is received after the third control signal. This is shown in an example in FIG. 11, where DCI #1 carries an UL Grant, which schedules a PUSCH in slot n+4 whilst DCI #2 schedules a PDSCH with a corresponding HARQ-ACK PUCCH allocated in slot n+4, thereby causing the PUSCH and HARQ-ACK to collide. The time between UL Grant and DL Grant is labelled as $T_{UL-DL}$, (i.e. between time $t_1$ and $t_2$ in FIG. 11). In this arrangement, the UL Grant is received first by the UE and hence the UE would start to construct the PUSCH and if the DL Grant (with the colliding PUCCH) is received early enough, i.e. before the PUSCH is constructed and sent to the physical layer, the Medium Access Control (MAC) layer at the UE can take into account the additional HARQ-ACK bits that need to be multiplexed and construct a PUSCH that meets the required reliability. This arrangement recognises that once the MAC has constructed the PUSCH, it is passed to the physical layer and hence it is difficult to change the PUSCH code rate. This time also allows the UE to evaluate whether a constructed PUSCH's code rate is low enough after taking into account the extra HARQ-ACK bits, to meet the required reliability. The value of $T_{MAC}$ can be a UE capability defined in the specifications, which is indicated by the UE to the network or RRC signalled by the network (based on other capability information from the UE).

In some implementations of the above-described arrangement, $T_{UL-DL}$ is the time between the UL Grant and DL Grant of the last PDSCH in the PUCCH Multiplexing Window. In other words, the one of the first control signals is a temporally last one of the first control signals. This recognises that only after the last DL Grant would the UE know the exact number of HARQ-ACK bits required in the PUCCH, and so the UE would only know after this point how to construct the PUSCH so that its code rate meets the reliability requirement.

In other implementations of the above-described arrangement, in a sub-slot based PUCCH operation, $T_{UL-DL}$ is the time between the UL Grant and the DL Grant scheduling the last PDSCH with a corresponding sub-slot PUCCH that collides with the PUSCH. In other words, the feedback signal is a first feedback signal, and the communications device is configured to receive at least one second control signal comprising an indication of a fourth set of radio resources of the wireless access interface in which the communications device is to receive a second downlink signal, to decode the second downlink signal, and to determine that the communications device should transmit a second feedback signal, indicating whether or not the second downlink signal was successfully received, in a fifth set of radio resources, the fifth set of radio resources at least partially overlapping in time with the third set of radio resources, wherein the first signal is the second control signal. It should be noted by those skilled in the art that, as described above, in a sub-slot based PUCCH, the PUSCH can collide with multiple PUCCHs.

Figure 12:
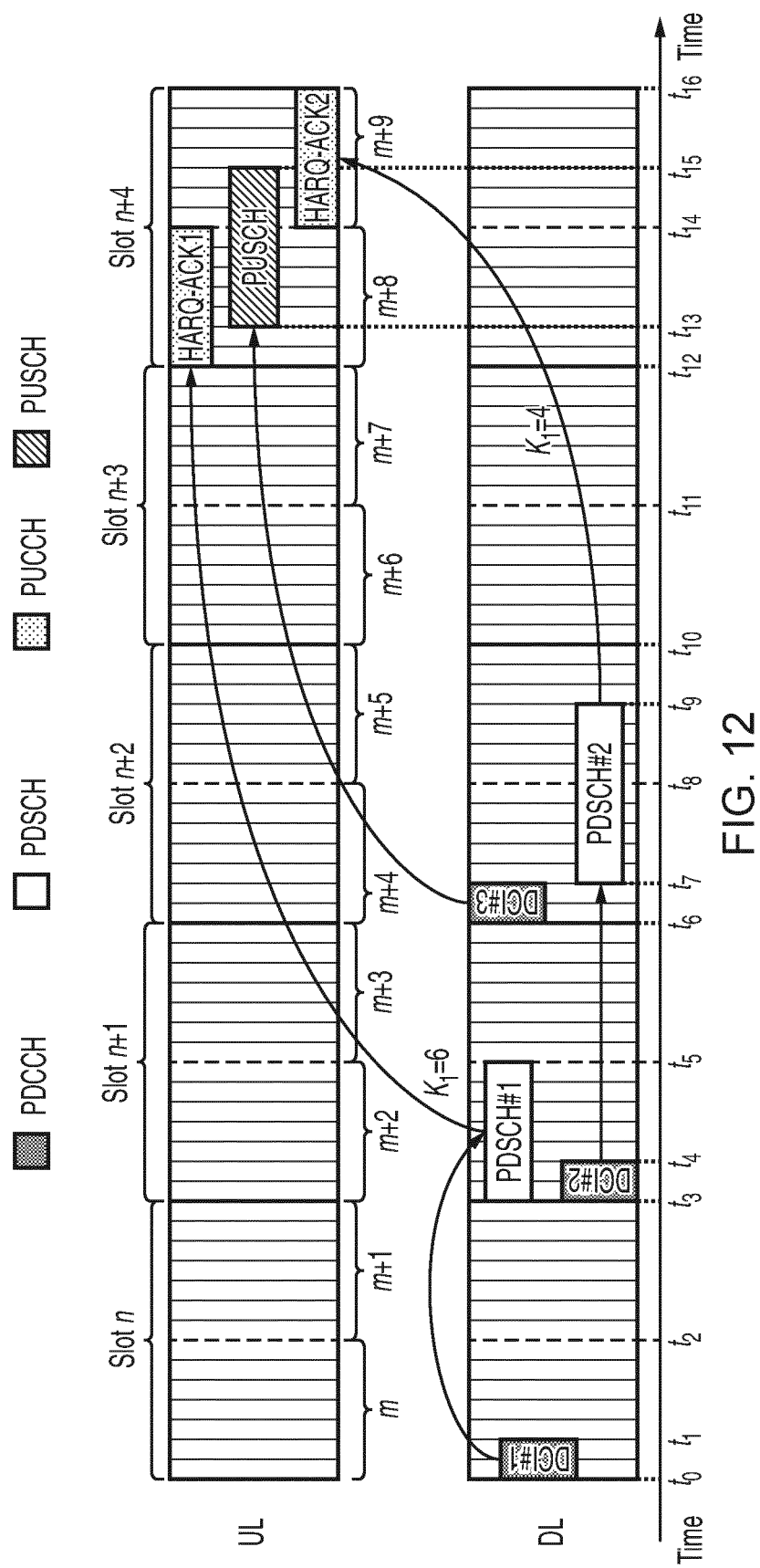
FIG. 12 shows a second example of how a UE may multiplex a HARQ-ACK PUCCH with a PUSCH where the HARQ-ACK and PUSCH collide based on a time between an uplink (UL) grant scheduling the PUSCH and a downlink (DL) grant scheduling a PDSCH to which the HARQ-ACK PUSCH relates in accordance with embodiments of the present technique.

In another arrangement of embodiments of the present technique, the UE is deemed to have sufficient time if the UL Grant scheduling the PUSCH comes after the last DL Grant with a corresponding PUCCH that collides with the PUSCH, i.e. if the UL Grant with the colliding PUSCH comes after the last DL Grant whose PUCCH it collides with then the HARQ-ACK is multiplexed into the PUSCH. In other words, the communications device is configured to receive a third control signal providing an indication of the third set of radio resources in which the communications device is to transmit the uplink signal, wherein the at least one communications criterion comprises whether the third control signal is received after all of the one or more first control signals. The last DL Grant can be the DL Grant that schedules the last PDSCH in a PUCCH Multiplexing Window, and if sub-slot PUCCH operation is used, it is the DL Grant that schedules the last PDSCH in any PUCCH Multiplexing Window that collides with the PUSCH. This recognises that if the UL Grant arrives after the DL Grant, the UE would be aware of the PUSCH and HARQ-ACK collision and hence would be able to take into account the extra HARQ-ACK bits when constructing a PUSCH so that it has a code rate that meets the required reliability. This arrangement also recognises that the gNB is aware of the PUSCH and HARQ-ACK collision when it schedules the UL Grant, and hence the gNB can also factor in the extra HARQ-ACK bits when it schedules the PUSCH to ensure its reliability. An example is shown in FIG. 12, where the PUCCH is sub-slot based. Here DCI #1 and DCI #2 schedule PDSCH #1 and PDSCH #2 respectively where their corresponding PUCCH carrying their HARQ-ACK feedback in sub-slot m+8 (HARQ-ACK1) and sub-slot m+9 (HARQ-ACK2) respectively. DCI #3 is an UL Grant scheduling a PUSCH that collides with HARQ-ACK1 and HARQ-ACK2. Since the UL Grant in DCI #3 arrives after the last DL Grant in DCI #2 (even though the DCI #3 arrives BEFORE PDSCH #2), that causes a PUCCH collision, the UE multiplexes HARQ-ACK1 and HARQ-ACK2 into the PUSCH as the UE is aware of such collision and therefore constructs a PUSCH with a code rate to meet the required reliability or the gNB, aware of such a collision, schedules the PUSCH to have sufficient code rate to meet the required reliability. For the case where some of the DL Grants come after the UL Grant scheduling the colliding PUSCH, the UE can:

Drop the lower priority channel, e.g. drop the eMBB PUSCH and transmit the URLLC HARQ-ACK or drop the eMBB HARQ-ACK and transmit the URLLC PUSCH. In other words, each of the uplink signal and the first downlink signals are associated with a different priority level, the feedback signal being associated with the same priority level as the first downlink signals, and if the at least one communications criterion is not met, the communications device is configured to drop the one of the uplink signal and the feedback signal depending on which of the uplink signal and the feedback signal has the lowest priority level, and to transmit only the one of the uplink signal and the feedback signal having the highest priority level; or Drop the lower priority channel if $N_{after}$ DL Grants out of $N_{Total}$ DL Grants, that have their feedback colliding with the PUSCH, come after the UL Grant scheduling the PUSCH. In other words, the communications device is configured to drop the one of the uplink signal and the feedback signal having the lowest priority level if a number of the one or more first control signals that are received after the third control signal is greater than a threshold number. For example $N_{after} > N_{Total}/2$, i.e. a majority of DL Grants come after the UL Grant, then the UE drops the lower priority channel.

In another arrangement of embodiments of the present technique, where the PUSCH is transmitted using a configured grant, the HARQ-ACK is multiplexed into the PUSCH if the last DL Grant causing a HARQ-ACK and PUSCH collision comes before the PUSCH configured grant is scheduled. In other words, the communications device is configured to determine the third set of radio resources based on a received Radio Resource Control, RRC, signalling message, the RRC signalling message indicating that the third set of radio resources are for use by the communications device as a configured grant, wherein the at least one communications criterion comprises whether a temporally last one of the first control signals is received before the communications device determines that the uplink signal should be transmitted in the third set of radio resources. A configured grant is UL resources that are semi-statically configured (using RRC signaling) for PUSCH transmission in a UE. This avoids the UE having to send a Scheduling Request (SR) and wait for an UL Grant in a DCI in order to transmit its PUSCH thereby significantly reducing latency.

Figure 13:
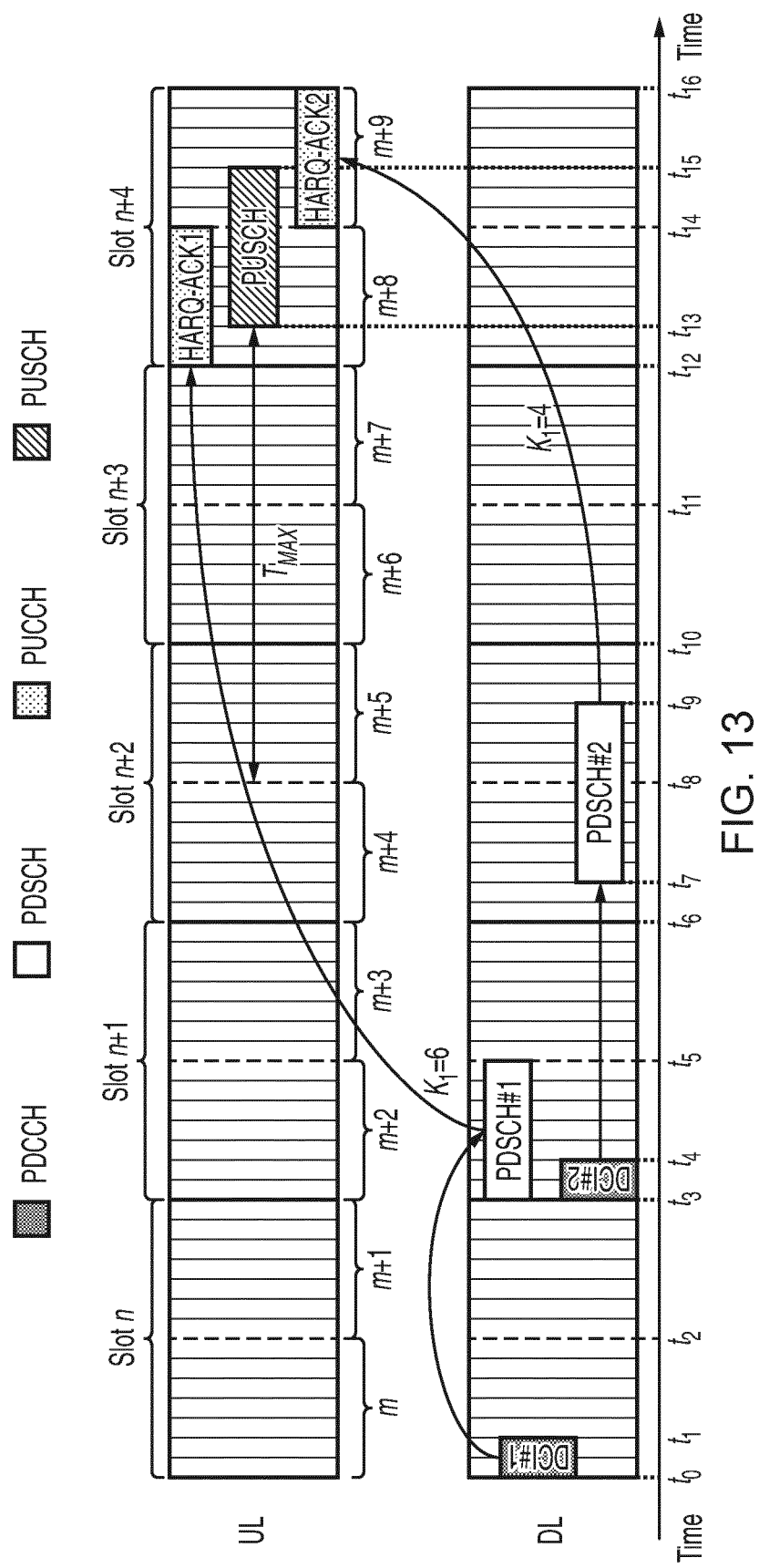
FIG. 13 shows an example of how a UE may multiplex a HARQ-ACK PUCCH with a PUSCH where the HARQ-ACK and PUSCH collide based on the use of a configured grant for the PUSCH.

One way to implement this arrangement is to define a maximum time $T_{MAX}$ between the UE making a decision to use a configured grant and the actual transmission of that PUSCH in that configured grant. In other words, the communications device is configured to determine the third set of radio resources based on a received Radio Resource Control, RRC, signalling message, the RRC signalling message indicating that the third set of radio resources are for use by the communications device as a configured grant, wherein the at least one communications criterion comprises whether a temporally last one of the first control signals is received before an earliest time at which the communications device is able to determine that the uplink signal should be transmitted in the third set of radio resources. An example is shown in FIG. 13, where $T_{MAX}$ is 23 OFDM symbols long and for a PUSCH transmitted at time $t_{13}$, the earliest time the UE can make a decision on using the configured grant in slot n+4 is at time $t_8$ (as can be seen, there are 23 symbols between time $t_8$ and $t_{13}$). Hence, if a DL Grant that causes a HARQ-ACK and PUSCH collision arrives between time $t_8$ and $t_{13}$, the UE does not multiplex the HARQ-ACK into the PUSCH. However, if the last DL Grant that causes a HARQ-ACK and PUSCH collision arrives before $t_8$ the we can assume that the UE has not made any decision on using the configured grant in slot n+4 and therefore if it decides to use that configured grant for PUSCH, it would be aware of all the HARQ-ACK bits that would collide with that PUSCH and include these HARQ-ACK bits when constructing the PUSCH to ensure it meets the required reliability.

Figure 14:
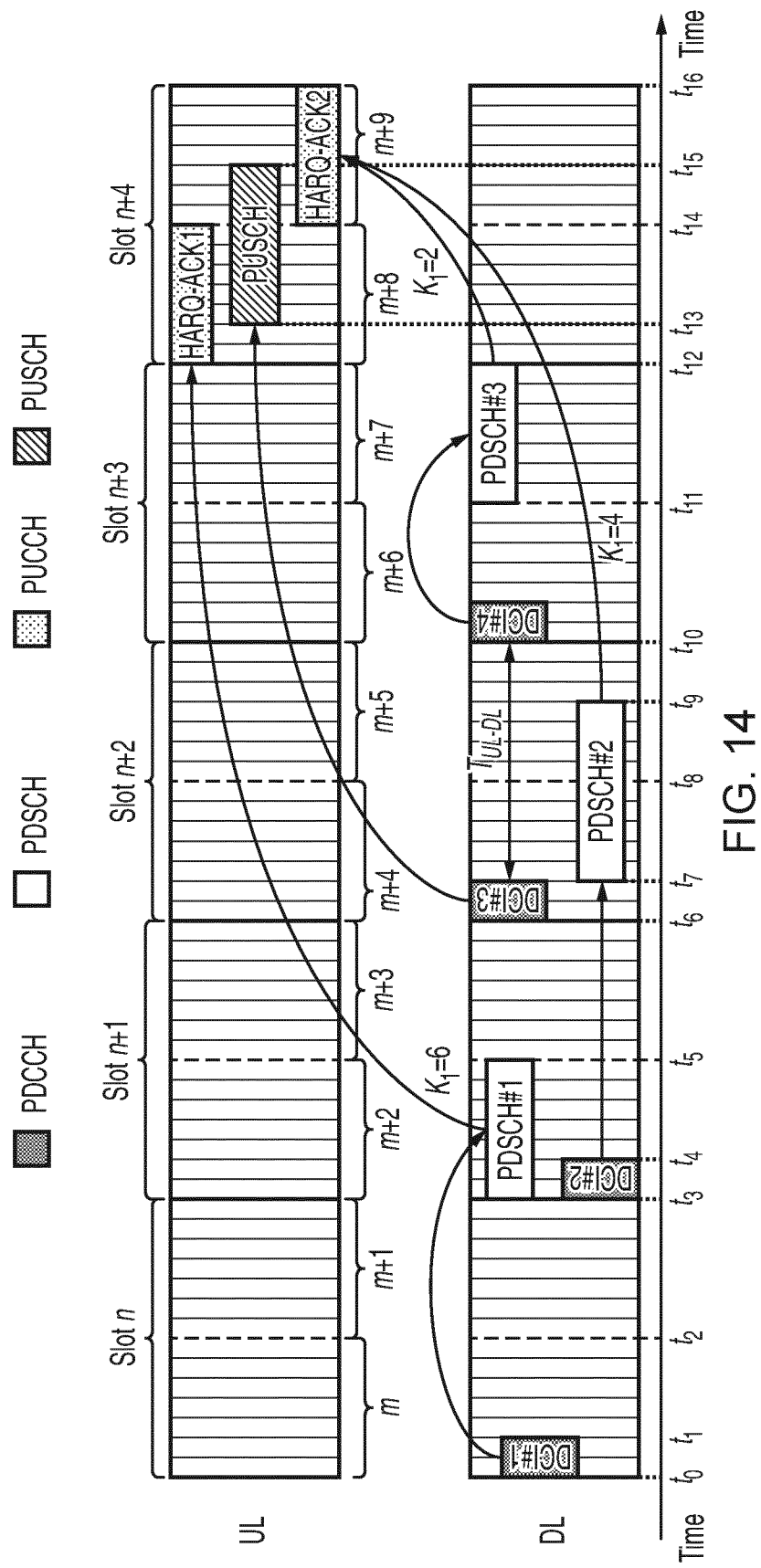
FIG. 14 shows an example of how a UE may multiplex a HARQ-ACK PUCCH with a PUSCH where the HARQ-ACK and PUSCH collide based on the known HARQ bits at a time at which the UE receives an UL grant scheduling the PUSCH.

The previously described arrangements of embodiments of the present technique try to multiplex all the colliding HARQ-ACK UCI into the PUSCH. In another arrangement of embodiments of the present technique, the UE needs only multiplex to the known HARQ-ACK UCI that collides with the PUSCH. For example, the UE would multiplex all those colliding HARQ-ACK UCIs if their corresponding DL Grant arrives before the UL Grant that schedules the colliding PUSCH. Any further HARQ-ACK collisions due to DL Grants arriving AFTER the UL Grant are not multiplexed. In other words, the communications device is configured to receive a third control signal providing an indication of the third set of radio resources in which the communications device is to transmit the uplink signal, wherein the at least one communications criterion comprises whether one or more of the first control signals are received before the third control signal, and wherein the communications device is configured to form the multiplexed signal by multiplexing the at least part of the feedback signal comprising an indication of whether or not each of the one or more first downlink signals that were received before the third control signal were successfully received into the uplink signal. An example is shown in FIG. 14, where DCI #1, DCI #2 and DCI #4 schedule PDSCH #1, PDSCH #2 and PDSCH #3 respectively. PDSCH #1's PUCCH carrying its HARQ-ACK (labelled as HARQ-ACK1) is scheduled in sub-slot m+8 whilst the PUCCH carrying HARQ-ACKs for PDSCH #2 and PDSCH #3 (labelled as HARQ-ACK2) is in sub-slot m+9. An UL Grant carried by DCI #3 schedules a PUSCH to transmit in slot n+4 thereby colliding with HARQ-ACK1 and HACQ-ACK2. Since the DL Grants carried by DCI #1 and DCI #2 comes before the UL Grant (DCI #3) their HARQ-ACK bits are multiplexed into the PUSCH. However, the DL Grant carried by DCI #4 arrives after the UL Grant (DCI #3) and so it is too late for the UE to take into account PDSCH #3's colliding HARQ-ACK, which is therefore not multiplexed into the PUSCH.

It should be appreciated that the above described embodiments of the present technique can be combined in any appropriate way. For example, in FIG. 14, if the time $T_{UL-DL}$, between DCI #3 (UL Grant) and DCI #4 (DL Grant) is less than $T_{MAC}$, as described by an above arrangement with reference to FIG. 11, the UE can multiplex PDSCH #3's HARQ-ACK into the PUSCH in addition to all those HARQ-ACKs where their corresponding DL Grant (DCI #1 and DCI #2) arrives before the UL Grant.

Flow Chart Representation

Figure 15:
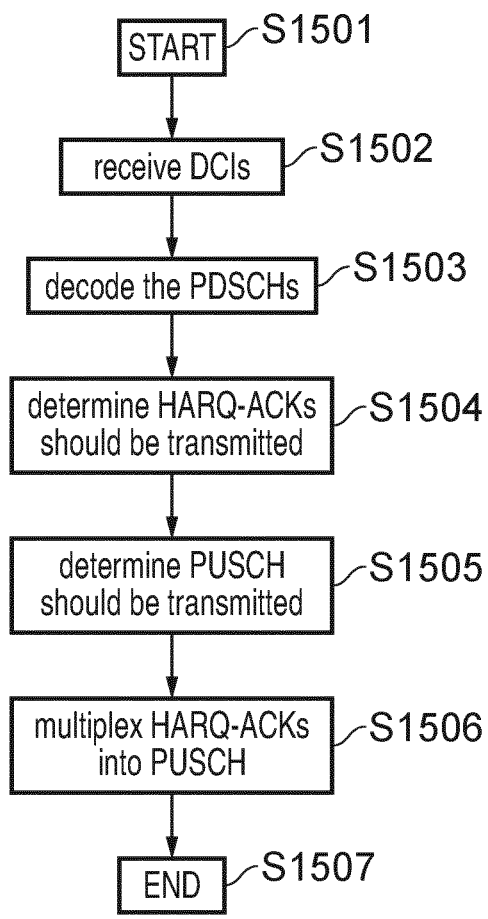
FIG. 15 shows a flow diagram illustrating a process of communications in a communications system in accordance with embodiments of the present technique.

FIG. 15 shows a flow diagram illustrating a first example process of communications in a communications system in accordance with embodiments of the present technique. The process shown by FIG. 15 is a method of operating a communications device configured to transmit data to or receive data from an infrastructure equipment of a wireless communications network.

The method begins in step S1501. The method comprises, in step S1502, receiving one or more first control signals each comprising an indication of one of one or more first sets of radio resources of the wireless access interface in each of which the communications device is to receive one of one or more first downlink signals. In step S1503, the method comprises decoding the one or more first downlink signals. The process then moves to step S1504, which involves determining that the communications device should transmit a feedback signal indicating, for each of the first downlink signals, whether or not the each of the first downlink signals were successfully received, wherein the communications device is configured to transmit the feedback signal in a second set of radio resources of the wireless access interface indicated by at least one of the first control signals. Next, in step S1505, the method comprises determining that the communications device should transmit an uplink signal in a third set of radio resources of the wireless access interface, the third set of radio resources at least partially overlapping in time (or sharing a same time-divided slot of the wireless access interface) with the second set of radio resources. The process then comprises, in step S1506, determining, in accordance with at least one communications criterion, whether the communications device should form a multiplexed signal by multiplexing at least a part of the feedback signal into the uplink signal and transmit the multiplexed signal in the third set of radio resources of the wireless access interface. The method ends in step S1507.

Those skilled in the art would appreciate that the method shown by FIG. 15 may be adapted in accordance with embodiments of the present technique. For example, other intermediate steps may be included in the method, or the steps may be performed in any logical order.

Though embodiments of the present technique have been described largely by way of the example communications system shown in FIG. 7, and in accordance with the examples of FIGS. 8 to 14, it would be clear to those skilled in the art that they could be equally applied to other systems to those described herein.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A communications device configured to transmit data or receive data, the communications device comprising transceiver circuitry configured to transmit signals and receive signals via a wireless access interface, and controller circuitry configured in combination with the transceiver circuitry to receive one or more first control signals each comprising an indication of one of one or more first sets of radio resources of the wireless access interface in each of which the communications device is to receive one of one or more first downlink signals, to decode the one or more first downlink signals, to determine that the communications device should transmit a feedback signal indicating, for each of the first downlink signals, whether or not the each of the first downlink signals were successfully received, wherein the communications device is configured to transmit the feedback signal in a second set of radio resources of the wireless access interface indicated by at least one of the first control signals, to determine that the communications device should transmit an uplink signal in a third set of radio resources of the wireless access interface, the third set of radio resources at least partially overlapping in time with or sharing a same time-divided slot of the wireless access interface with the second set of radio resources, and to determine, in accordance with at least one communications criterion, whether the communications device should form a multiplexed signal by multiplexing at least a part of the feedback signal into the uplink signal and transmit the multiplexed signal in the third set of radio resources of the wireless access interface.

Paragraph 2. A communications device according to Paragraph 1, wherein each of the uplink signal and the first downlink signals are associated with a different priority level, the feedback signal being associated with the same priority level as the first downlink signals, and if the communications device determines that the multiplexed signal should not be formed, the communications device is configured to drop the one of the uplink signal and the feedback signal depending on which of the uplink signal and the feedback signal has the lowest priority level, and to transmit only the one of the uplink signal and the feedback signal having the highest priority level.

Paragraph 3. A communications device according to Paragraph 1 or Paragraph 2, wherein the at least one communications criterion comprises whether a length of time between one of the one or more first control signals and the start of the third set of radio resources is greater than a minimum amount of time required by the communications device to form the multiplexed signal which meets at least one reliability requirement.

Paragraph 4. A communications device according to Paragraph 3, wherein the at least one reliability requirement is dependent on a number of bits in the feedback signal.

Paragraph 5. A communications device according to Paragraph 3 or Paragraph 4, wherein the at least one reliability requirement comprises a coding rate of the multiplexed signal being below a threshold coding rate.

Paragraph 6. A communications device according to any of Paragraphs 1 to 5, wherein the at least one communications criterion comprises whether a length of time between reception of a first signal and the start of the third set of radio resources is greater than a threshold length of time.

Paragraph 7. A communications device according to Paragraph 6, wherein the first signal is one of the first control signals.

Paragraph 8. A communications device according to Paragraph 7, wherein the one of the first control signals is a temporally last one of the first control signals.

Paragraph 9. A communications device according to any of Paragraphs 6 to 8, wherein the feedback signal is a first feedback signal, and the communications device is configured to receive at least one second control signal comprising an indication of a fourth set of radio resources of the wireless access interface in which the communications device is to receive a second downlink signal, to decode the second downlink signal, and to determine that the communications device should transmit a second feedback signal, indicating whether or not the second downlink signal was successfully received, in a fifth set of radio resources, the fifth set of radio resources at least partially overlapping in time with the third set of radio resources, wherein the first signal is the second control signal.

Paragraph 10. A communications device according to any of Paragraphs 1 to 9, wherein the communications device is configured to receive a third control signal before at least one of the first control signals, the third control signal providing an indication of the third set of radio resources in which the communications device is to transmit the uplink signal, wherein the at least one communications criterion comprises whether a length of time between reception of the third control signal and reception of a first signal is greater than a threshold length of time.

Paragraph 11. A communications device according to Paragraph 10, wherein the first signal is one of the at least one first control signals that is received after the third control signal.

Paragraph 12. A communications device according to Paragraph 11, wherein the one of the first control signals is a temporally last one of the first control signals.

Paragraph 13. A communications device according to any of Paragraphs 10 to 12, wherein the feedback signal is a first feedback signal, and the communications device is configured to receive at least one second control signal comprising an indication of a fourth set of radio resources of the wireless access interface in which the communications device is to receive a second downlink signal, to decode the second downlink signal, and to determine that the communications device should transmit a second feedback signal, indicating whether or not the second downlink signal was successfully received, in a fifth set of radio resources, the fifth set of radio resources at least partially overlapping in time with the third set of radio resources, wherein the first signal is the second control signal.

Paragraph 14. A communications device according to any of Paragraphs 1 to 13, wherein the communications device is configured to receive a third control signal providing an indication of the third set of radio resources in which the communications device is to transmit the uplink signal, wherein the at least one communications criterion comprises whether the third control signal is received after all of the one or more first control signals.

Paragraph 15. A communications device according to Paragraph 14, wherein each of the uplink signal and the first downlink signals are associated with a different priority level, the feedback signal being associated with the same priority level as the first downlink signals, and if the at least one communications criterion is not met, the communications device is configured to drop the one of the uplink signal and the feedback signal depending on which of the uplink signal and the feedback signal has the lowest priority level, and to transmit only the one of the uplink signal and the feedback signal having the highest priority level.

Paragraph 16. A communications device according to Paragraph 15, wherein the communications device is configured to drop the one of the uplink signal and the feedback signal having the lowest priority level if a number of the one or more first control signals that are received after the third control signal is greater than a threshold number.

Paragraph 17. A communications device according to any of Paragraphs 1 to 16, wherein the communications device is configured to determine the third set of radio resources based on a received Radio Resource Control, RRC, signalling message, the RRC signalling message indicating that the third set of radio resources are for use by the communications device as a configured grant, wherein the at least one communications criterion comprises whether a temporally last one of the first control signals is received before the communications device determines that the uplink signal should be transmitted in the third set of radio resources.

Paragraph 18. A communications device according to any of Paragraphs 1 to 17, wherein the communications device is configured to determine the third set of radio resources based on a received Radio Resource Control, RRC, signalling message, the RRC signalling message indicating that the third set of radio resources are for use by the communications device as a configured grant, wherein the at least one communications criterion comprises whether a temporally last one of the first control signals is received before an earliest time at which the communications device is able to determine that the uplink signal should be transmitted in the third set of radio resources.

Paragraph 19. A communications device according to any of Paragraphs 1 to 18, wherein the communications device is configured to receive a third control signal providing an indication of the third set of radio resources in which the communications device is to transmit the uplink signal, wherein the at least one communications criterion comprises whether one or more of the first control signals are received before the third control signal, and wherein the communications device is configured to form the multiplexed signal by multiplexing the at least part of the feedback signal comprising an indication of whether or not each of the one or more first downlink signals that were received before the third control signal were successfully received into the uplink signal.

Paragraph 20. A method of operating a communications device configured to transmit data to or receive data from an infrastructure equipment of a wireless communications network, the method comprising receiving one or more first control signals each comprising an indication of one of one or more first sets of radio resources of the wireless access interface in each of which the communications device is to receive one of one or more first downlink signals, decoding the one or more first downlink signals, determining that the communications device should transmit a feedback signal indicating, for each of the first downlink signals, whether or not the each of the first downlink signals were successfully received, wherein the communications device is configured to transmit the feedback signal in a second set of radio resources of the wireless access interface indicated by at least one of the first control signals, determining that the communications device should transmit an uplink signal in a third set of radio resources of the wireless access interface, the third set of radio resources at least partially overlapping in time with or sharing a same time-divided slot of the wireless access interface with the second set of radio resources, and determining, in accordance with at least one communications criterion, whether the communications device should form a multiplexed signal by multiplexing at least a part of the feedback signal into the uplink signal and transmit the multiplexed signal in the third set of radio resources of the wireless access interface.

Paragraph 21. Circuitry for a communications device configured to transmit data or receive data, the communications device comprising transceiver circuitry configured to transmit signals and receive signals via a wireless access interface, and controller circuitry configured in combination with the transceiver circuitry to receive one or more first control signals each comprising an indication of one of one or more first sets of radio resources of the wireless access interface in each of which the communications device is to receive one of one or more first downlink signals, to decode the one or more first downlink signals, to determine that the communications device should transmit a feedback signal indicating, for each of the first downlink signals, whether or not the each of the first downlink signals were successfully received, wherein the communications device is configured to transmit the feedback signal in a second set of radio resources of the wireless access interface indicated by at least one of the first control signals, to determine that the communications device should transmit an uplink signal in a third set of radio resources of the wireless access interface, the third set of radio resources at least partially overlapping in time with or sharing a same time-divided slot of the wireless access interface with the second set of radio resources, and to determine, in accordance with at least one communications criterion, whether the communications device should form a multiplexed signal by multiplexing at least a part of the feedback signal into the uplink signal and transmit the multiplexed signal in the third set of radio resources of the wireless access interface.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.

[2] TR 38.913, "Study on Scenarios and Requirements for Next Generation Access Technologies (Release 14)", v14.3.0.

[3] RP-190726, "Physical layer enhancements for NR ultra-reliable and low latency communication (URLLC)", Huawei, HiSilicon, RAN #83.

What is claimed is:

1. A communications device configured to transmit data or receive data, the communications device comprising:
   transceiver circuitry configured to transmit signals and receive signals via a wireless access interface, and
   controller circuitry configured in combination with the transceiver circuitry:
      to receive one or more first control signals each comprising an indication of one of one or more first sets of radio resources of the wireless access interface in each of which the communications device is to receive one of one or more first downlink signals,
      to decode the one or more first downlink signals,
      to determine that the communications device should transmit a feedback signal indicating, for each of the first downlink signals, whether or not the each of the first downlink signals were successfully received, wherein the communications device is configured to transmit the feedback signal in a second set of radio resources of the wireless access interface indicated by at least one of the first control signals,
      to determine that the communications device should transmit an uplink signal in a third set of radio resources of the wireless access interface, the third set of radio resources at least partially overlapping in time with or sharing a same time-divided slot of the wireless access interface with the second set of radio resources,
      to determine, in accordance with whether at least one communications criterion is met, whether the communications device should form a multiplexed signal by multiplexing at least a part of the feedback signal into the uplink signal and transmit the multiplexed signal in the third set of radio resources of the wireless access interface, and
      to adjust at least one of the uplink signal and the third set of resources such that the at least one communications criterion is met, when the at least one communications criterion is not met.

2. The communications device according to claim 1, wherein each of the uplink signal and the first downlink signals are associated with a different priority level, the feedback signal being associated with the same priority level as the first downlink signals, and if the communications device determines that the multiplexed signal should not be formed, the communications device is configured:
   to drop the one of the uplink signal and the feedback signal depending on which of the uplink signal and the feedback signal has the lowest priority level, and
   to transmit only the one of the uplink signal and the feedback signal having the highest priority level.

3. The communications device according to claim 1, wherein the at least one communications criterion comprises whether a length of time between one of the one or more first control signals and the start of the third set of radio resources is greater than a minimum amount of time required by the communications device to form the multiplexed signal which meets at least one reliability requirement.

4. The communications device according to claim 3, wherein the at least one reliability requirement is dependent on a number of bits in the feedback signal.

5. The communications device according to claim 3, wherein the at least one reliability requirement comprises a coding rate of the multiplexed signal being below a threshold coding rate.

6. The communications device according to claim 1, wherein the at least one communications criterion comprises whether a length of time between reception of a first signal and the start of the third set of radio resources is greater than a threshold length of time.

7. The communications device according to claim 6, wherein the first signal is one of the first control signals.

8. The communications device according to claim 7, wherein the one of the first control signals is a temporally last one of the first control signals.

9. The communications device according to claim 6, wherein the feedback signal is a first feedback signal, and the communications device is configured;
   to receive at least one second control signal comprising an indication of a fourth set of radio resources of the wireless access interface in which the communications device is to receive a second downlink signal,
   to decode the second downlink signal, and
   to determine that the communications device should transmit a second feedback signal, indicating whether or not the second downlink signal was successfully received, in a fifth set of radio resources, the fifth set of radio resources at least partially overlapping in time with the third set of radio resources,
   wherein the first signal is the second control signal.

10. The communications device according to claim 1, wherein the communications device is configured:
    to receive a third control signal before at least one of the first control signals, the third control signal providing an indication of the third set of radio resources in which the communications device is to transmit the uplink signal,
    wherein the at least one communications criterion comprises whether a length of time between reception of the third control signal and reception of a first signal is greater than a threshold length of time.

11. The communications device according to claim 10, wherein the first signal is one of the at least one first control signals that is received after the third control signal.

12. The communications device according to claim 11, wherein the one of the first control signals is a temporally last one of the first control signals.

13. The communications device according to claim 10, wherein the feedback signal is a first feedback signal, and the communications device is configured:
    to receive at least one second control signal comprising an indication of a fourth set of radio resources of the wireless access interface in which the communications device is to receive a second downlink signal,
    to decode the second downlink signal, and
    to determine that the communications device should transmit a second feedback signal, indicating whether or not the second downlink signal was successfully received, in a fifth set of radio resources, the fifth set of radio resources at least partially overlapping in time with the third set of radio resources,
    wherein the first signal is the second control signal.

14. The communications device according to claim 1, wherein the communications device is configured;
    to receive a third control signal providing an indication of the third set of radio resources in which the communications device is to transmit the uplink signal, wherein the at least one communications criterion comprises whether the third control signal is received after all of the one or more first control signals.

15. The communications device according to claim 14, wherein each of the uplink signal and the first downlink signals are associated with a different priority level, the feedback signal being associated with the same priority level as the first downlink signals, and if the at least one communications criterion is not met, the communications device is configured:
to drop the one of the uplink signal and the feedback signal depending on which of the uplink signal and the feedback signal has the lowest priority level, and
to transmit only the one of the uplink signal and the feedback signal having the highest priority level.

16. The communications device according to claim 15, wherein the communications device is configured to drop the one of the uplink signal and the feedback signal having the lowest priority level if a number of the one or more first control signals that are received after the third control signal is greater than a threshold number.

17. The communications device according to claim 1, wherein the communications device is configured:
to determine the third set of radio resources based on a received Radio Resource Control (RRC) signalling message, the RRC signalling message indicating that the third set of radio resources are for use by the communications device as a configured grant,
wherein the at least one communications criterion comprises whether a temporally last one of the first control signals is received before the communications device determines that the uplink signal should be transmitted in the third set of radio resources.

18. The communications device according to claim 1, wherein the communications device is configured:
to determine the third set of radio resources based on a received Radio Resource Control (RRC) signalling message, the RRC signalling message indicating that the third set of radio resources are for use by the communications device as a configured grant,
wherein the at least one communications criterion comprises whether a temporally last one of the first control signals is received before an earliest time at which the communications device is able to determine that the uplink signal should be transmitted in the third set of radio resources.

19. The communications device according to claim 1, wherein the communications device is configured:
to receive a third control signal providing an indication of the third set of radio resources in which the communications device is to transmit the uplink signal,
wherein the at least one communications criterion comprises whether one or more of the first control signals are received before the third control signal, and wherein the communications device is configured to form the multiplexed signal by multiplexing the at least part of the feedback signal comprising an indication of whether or not each of the one or more first downlink signals that were received before the third control signal were successfully received into the uplink signal.

20. A method of operating a communications device configured to transmit data to or receive data from an infrastructure equipment of a wireless communications network, the method comprising:
receiving one or more first control signals each comprising an indication of one of one or more first sets of radio resources of the wireless access interface in each of which the communications device is to receive one of one or more first downlink signals,
decoding the one or more first downlink signals,
determining that the communications device should transmit a feedback signal indicating, for each of the first downlink signals, whether or not the each of the first downlink signals were successfully received, wherein the communications device is configured to transmit the feedback signal in a second set of radio resources of the wireless access interface indicated by at least one of the first control signals,
determining that the communications device should transmit an uplink signal in a third set of radio resources of the wireless access interface, the third set of radio resources at least partially overlapping in time with or sharing a same time-divided slot of the wireless access interface with the second set of radio resources,
determining, in accordance with whether at least one communications criterion is met, whether the communications device should form a multiplexed signal by multiplexing at least a part of the feedback signal into the uplink signal and transmit the multiplexed signal in the third set of radio resources of the wireless access interface, and
adjusting at least one of the uplink signal and the third set of resources such that the at least one communications criterion is met, when the at least one communications criterion is not met.

\* \* \* \* \*